(12) United States Patent
Maltsev et al.

(10) Patent No.: US 9,326,273 B2
(45) Date of Patent: Apr. 26, 2016

(54) APPARATUS, SYSTEM AND METHOD OF WIRELESS BACKHAUL COMMUNICATION BETWEEN WIRELESS COMMUNICATION NODES

(71) Applicant: Intel Corporation, Santa Clara, CA (US)

(72) Inventors: Alexander Maltsev, Nizhny Novgorod (RU); Ali S. Sadri, San Diego, CA (US); Vadim Sergeyev, Nizhny Novgorod (RU); Artyom Lomayev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 245 days.

(21) Appl. No.: 13/865,625

(22) Filed: Apr. 18, 2013

(65) Prior Publication Data

US 2014/0206368 A1    Jul. 24, 2014

Related U.S. Application Data

(60) Provisional application No. 61/756,302, filed on Jan. 24, 2013.

(51) Int. Cl.
*H04W 72/04* (2009.01)
*H04W 88/06* (2009.01)
*H04W 92/20* (2009.01)
*H04W 84/04* (2009.01)

(52) U.S. Cl.
CPC ........ *H04W 72/0406* (2013.01); *H04W 84/045* (2013.01); *H04W 88/06* (2013.01); *H04W 92/20* (2013.01)

(58) Field of Classification Search
CPC ............ H04W 72/0406; H04W 76/00; H04W 84/045; H04W 92/20; H04W 88/06
See application file for complete search history.

(56) References Cited

U.S. PATENT DOCUMENTS

| 8,300,590 | B1 | 10/2012 | Negus et al. |
| 8,599,955 | B1 | 12/2013 | Kludt et al. |
| 8,797,969 | B1 | 8/2014 | Harel et al. |
| 2001/0036810 | A1* | 11/2001 | Larsen .......................... 455/11.1 |

(Continued)

FOREIGN PATENT DOCUMENTS

| JP | 2012175675 | 9/2012 |
| KR | 20110092478 | 8/2011 |

(Continued)

OTHER PUBLICATIONS

Office Action for U.S. Appl. No. 13/869,541, mailed on Nov. 6, 2014, 18 pages.

(Continued)

*Primary Examiner* — Nathan Mitchell
(74) *Attorney, Agent, or Firm* — Shichrur & Co.

(57) ABSTRACT

Some demonstrative embodiments include apparatuses, systems and/or methods of wireless backhaul communication between wireless communication nodes. For example, a wireless communication controller may control a wireless communication node to communicate with one or more other wireless communication nodes via one or more backhaul links of a backhaul network over a first frequency band, and to communicate with a control station via a control link over a second frequency band, the first frequency band is higher than the second frequency band.

29 Claims, 6 Drawing Sheets

(56) References Cited

U.S. PATENT DOCUMENTS

| | | | |
|---|---|---|---|
| 2004/0008663 A1* | 1/2004 | Srikrishna et al. | 370/351 |
| 2005/0094585 A1* | 5/2005 | Golden et al. | 370/310 |
| 2008/0080414 A1 | 4/2008 | Thubert et al. | |
| 2008/0090575 A1 | 4/2008 | Barak et al. | |
| 2008/0181183 A1* | 7/2008 | Gale et al. | 370/336 |
| 2009/0303935 A1* | 12/2009 | Ozluturk | 370/328 |
| 2010/0234071 A1 | 9/2010 | Shabtay et al. | |
| 2011/0038308 A1 | 2/2011 | Song et al. | |
| 2011/0069687 A1 | 3/2011 | Rezvani et al. | |
| 2011/0182174 A1 | 7/2011 | Pi et al. | |
| 2012/0113884 A1* | 5/2012 | Park et al. | 370/312 |
| 2012/0250603 A1* | 10/2012 | Huang et al. | 370/315 |
| 2013/0070743 A1 | 3/2013 | Picker | |
| 2013/0084868 A1* | 4/2013 | Song et al. | 455/436 |
| 2013/0095747 A1* | 4/2013 | Moshfeghi | 455/7 |
| 2013/0121185 A1 | 5/2013 | Li et al. | |
| 2013/0142136 A1 | 6/2013 | Pi et al. | |
| 2014/0185497 A1* | 7/2014 | Wolf et al. | 370/294 |
| 2014/0247752 A1* | 9/2014 | Patil et al. | 370/255 |

FOREIGN PATENT DOCUMENTS

| | | |
|---|---|---|
| KR | 20130007494 | 1/2013 |
| WO | 2009041754 | 4/2009 |

OTHER PUBLICATIONS

WiGig MAC and PHY Specification; Version 1.1; Apr. 2011—Final Specification. pp. 1-442.

IEEE Std 802.11™-2012 (Revision of IEEE Std 802.11-2007) IEEE Standard for Information technology—Telecommunications and information exchange between systems Local and metropolitan area networks—Specific requirements Part 11: Wireless LAN Medium Access Control (MAC) and Physical Layer (PHY) Specifications Mar. 29, 2012.

IEEE Std 802.11ad™-2012 (Amendment to IEEE Std 802.11™-2012, as amended by IEEE Std 802.11ae™-2012 and IEEE Std 802.11aa™-2012) IEEE Standard for Information technology—Telecommunications and information exchange between systems Local and metropolitan area networks—Specific requirements Part 11: Wireless LAN Medium Access Control (MAC) and Physical Layer (PHY) Specifications.

ETSI TS 136 300 V11.3.0 (Nov. 2012): LTE; Evolved Universal Terrestrial Radio Access (EUTRA) and Evolved Universal Terrestrial Radio Access Network (E-UTRAN); Overall description; Stage 2 (3GPP TS 36.300 version 11.3.0 Release 11).

U.S. Appl. No. 13/869,541, filed Apr. 24, 2013.

International Search Report and Written Opinion for PCT Patent Application No. PCT/US2014/012169, mailed on Apr. 24, 2014, 15 pages.

International Search Report and Written Opinion for PCT Patent Application No. PCT/US2014/012477, mailed on Apr. 24, 2014, 12 pages.

Uday Mudoi, "Understanding Small-Cell Unification's Vital Role in LTE and 4G", Electronic Design, Aug. 2, 2012, 6 pages.

International Preliminary Report on Patentability and Written Opinion for International Patent Application No. PCT/US2014/012169, mailed on Jul. 30, 2015, 11 pages.

Final Office Action for U.S. Appl. No. 13/869,541, mailed on May 27, 2015, 26 pages.

International Preliminary Report on Patentability and Written Opinion for International Patent Application No. PCT/US2014/012477, mailed on Aug. 6, 2015, 9 pages.

Office Action for Taiwanese Patent Application Serial No. 103101264, mailed on Jan. 29, 2016, 13 pages (including 1 page of English translation).

* cited by examiner

APPARATUS, SYSTEM AND METHOD OF WIRELESS BACKHAUL COMMUNICATION BETWEEN WIRELESS COMMUNICATION NODES

CROSS REFERENCE

This application claims the benefit of and priority from U.S. Provisional Patent Application No. 61/756,302 entitled "Millimeter Wave Backhauling System for Small Cells with Central Control From a Macro Base Station", filed Jan. 24, 2013, the entire disclosure of which is incorporated herein by reference.

TECHNICAL FIELD

Embodiments described herein generally relate to wireless communication between wireless communication nodes.

BACKGROUND

Some wireless communication units may be deployed according to a wireless network topology involving a plurality of small cells, which may be employed to exchange information with mobile users. Such small cells may substantially increase entire network capacity.

However, deployments involving large numbers of small cells may require a very well developed backhaul infrastructure to provide adequate core network access. Such backhaul infrastructure may be bulky and/or expensive.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
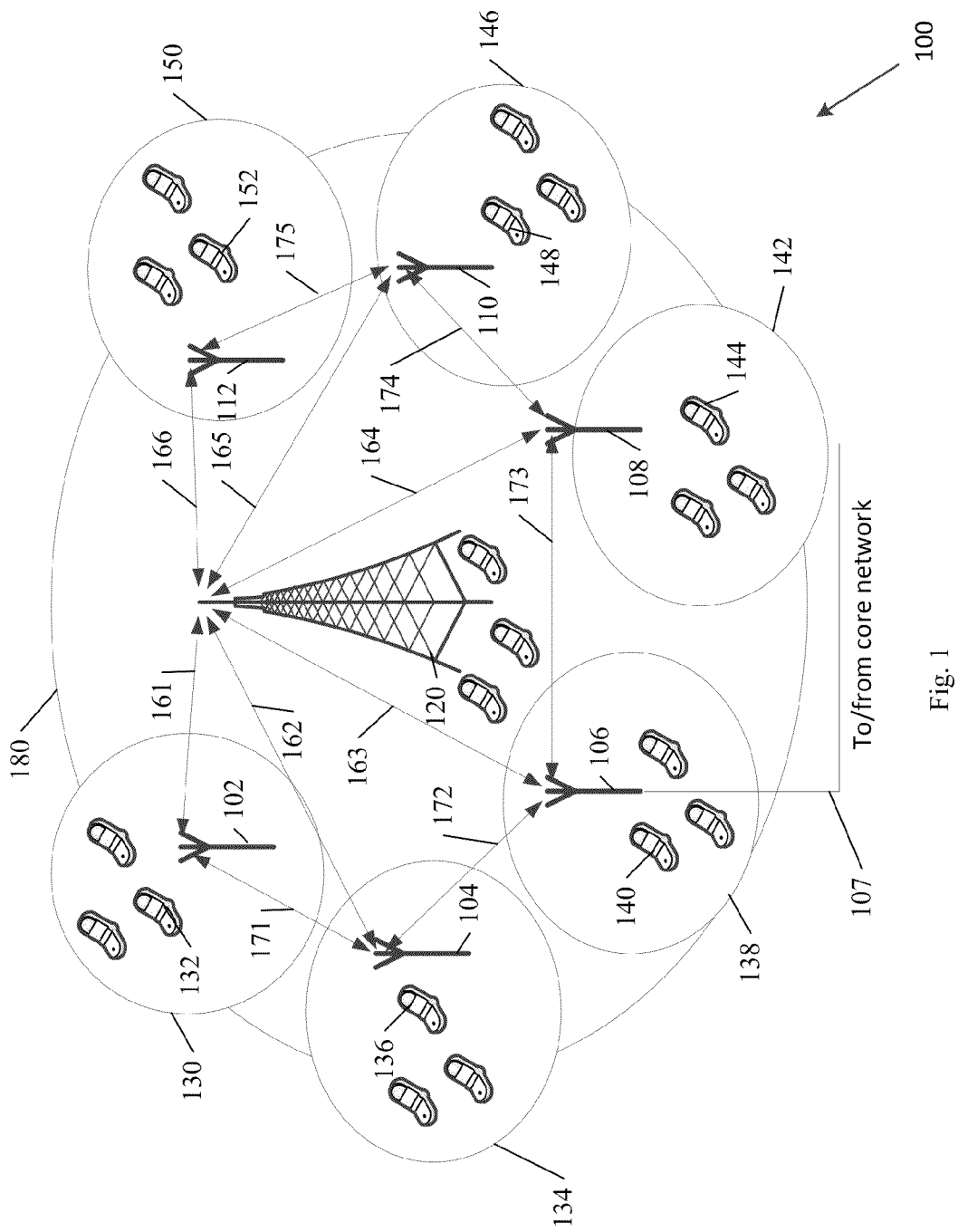
FIG. 1 is a schematic block diagram illustration of a deployment of a multi-cell wireless communication system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 *task group ac* (*TGac*) (*"IEEE*802.11-09/0308r12—*TGac Channel Model Addendum Document"*); *IEEE* 802.11 *task group ad* (*TGad*) (*IEEE P*802.11*ad Standard for Information Technology—Telecom-* munications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing Long Term Evolution (LTE) specifications (including ETSI TS 136 300 V11.3.0 (2012-11): LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 2012) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular network. However, other embodiments may be implemented in any other suitable cellular network, e.g., a 3G cellular network, a 4G cellular network, a 5G cellular network, a WiMax cellular network, and the like.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 20 Ghz and 300 GHZ, a WLAN frequency band, a WPAN frequency band, a Wireless-Gigabit (WiGig) frequency band, e.g., according to the WGA specification, a WiFi frequency band, a frequency band according to the IEEE 802.11 standards, e.g., according to IEEE 802.11 ad ("the 802.11 ad frequency band"), and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the mmWave or DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

The term "cell", as used herein, may include a combination of network resources, for example, downlink and optionally uplink resources. The resources may be controlled and/or allocated, for example, by a wireless communication node (also referred to as a "node" or a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a deployment of a multi-cell wireless communication system 100, in accordance with some demonstrative embodiments.

In some demonstrative embodiments, system 100 may include one or more wireless communication devices capable of communicating content, data, information and/or signals via a wireless medium (WM). The wireless medium may include, for example, a radio channel, a cellular channel, an RF channel, a Wireless Fidelity (WiFi) channel, a WiGig channel, a mmWave channel, an IR channel, and the like. One or more elements of system 100 may optionally be capable of communicating over any suitable wired communication links.

In some demonstrative embodiments, system 100 may be deployed to include a network of a plurality of cells, e.g., small cells, which may be configured, for example, to deliver data to/from mobile users in order, for example, to substantially increase the throughput of the entire network.

In some demonstrative embodiments, a cell may include a wireless communication node, which may be configured to cover and/or serve a plurality of users, for example, mobile devices, e.g., User Equipment (UE), and the like. The wireless communication node may include or perform the functionality of a Base Station (BS), an Access Point (AP), an LTE node, an LTE evolved node B (eNB), and the like. The deployment of the small cells may provide, for example, high-speed wireless access for communication by many users, e.g., simultaneously.

In some demonstrative embodiments, the size of a small cell may be configured, for example, such that the wireless communication node may be able to cover the small cell. In one example, the small cell may have a coverage range of about 10-100 meters, or any other range.

In some demonstrative embodiments, a relatively large number of small cell base stations may be deployed to cover substantial areas such as a city or several blocks in the city. In one example, elements of system 100 may be deployed, for example, in outdoor spaces, e.g., a street, a stadium, and the like, and/or large indoor areas, e.g., conference halls, and the like.

In some demonstrative embodiments, system 100 may include a plurality of wireless communication nodes configured to communicate with one or more mobile devices of one or more wireless communication cells, e.g., small cells.

For example, as shown in FIG. 1, system 100 may include a wireless communication node 102 to communicate with one or more mobile devices 132 of a wireless communication cell 130; a wireless communication node 104 to communicate with one or more mobile devices 136 of a wireless communication cell 134; a wireless communication node 106 to communicate with one or more mobile devices 140 of a wireless communication cell 138; a wireless communication node 108 to communicate with one or more mobile devices 144 of a wireless communication cell 142; a wireless communication node 110 to communicate with one or more mobile devices 148 of a wireless communication cell 146; and/or a wireless communication node 112 to communicate with one or more mobile devices 152 of a wireless communication cell 150.

In some demonstrative embodiments, nodes 102, 104, 106, 108, 110 and/or 112 may include or may perform the functionality of a BS, a macro BS, a micro BS, an AP, a WiFi node or station, a WiGig node or station, a Wimax node or station, a cellular node, an evolved Node B (eNB), a pico eNB, an LTE node, a station, a hot spot, a network controller, and the like.

In some demonstrative embodiments, nodes 102, 104, 106, 108, 110 and/or 112 may include a wireless communication device including one or more antennas, and one or more wireless communication transceivers, e.g., as described below with reference to FIG. 4.

In some demonstrative embodiments, mobile devices 132, 136, 140, 144, 148 and/or 152 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, a well-developed backhaul infrastructure may be utilized to connect wireless communication nodes 102, 104, 106, 108, 110 and/or 112 to a core network.

In some demonstrative embodiments, wireless communication nodes 102, 104, 106, 108, 110 and/or 112 may be configured to communicate over a plurality of wireless backhaul links, e.g., as described below.

In some demonstrative embodiments, the wireless backhaul links may include high-throughput links.

In some demonstrative embodiments, the wireless backhaul links may include wireless communication links over a high frequency band, for example, mmWave links over the mmWave frequency band, e.g., as described below. In one example, the mmWave links may include DMG links, links according to the WiGig specifications ("WiGig links"), links according to the IEEE 802.11ad specification ("802.11ad links"), and the like. In other embodiments, the wireless backhaul links may include any other wireless communication links over any other wireless communication frequency band and/or according to any other wireless communication standard and/or specification.

In some demonstrative embodiments, a backhaul network may require advanced routing and/or scheduling algorithms to be implemented, for example, together with device discovery and/or device failure management. It may be hard to implement such a backhaul network using only mmWave links between the wireless communication nodes.

In some demonstrative embodiments, system 100 may be configured according to a dual-band backhaul scheme, which includes communicating backhaul traffic over a first frequency band, and communicating control information over a second frequency band, e.g., as described in detail below.

In some demonstrative embodiments, the dual-band backhaul scheme may enable, for example, communicating control functionality, e.g., for controlling the backhaul links, at relatively lower speeds and/or throughputs, and communicating the backhaul traffic at relatively higher speeds and/or throughputs.

In some demonstrative embodiments, the first frequency band may be greater than the second frequency band.

In some demonstrative embodiments, the first frequency band may include the mmWave frequency band and the second frequency band may include a non-mmWave frequency band.

In one example, the first frequency band may include a DMG frequency band, for example, a 60 Gigahertz (GHz) frequency band, and the second frequency band may include a cellular frequency band, for example, an LTE frequency band, e.g., a 2.4 GHz frequency band. In other embodiments, the first and second frequency bands may include any other combination of frequency bands.

In some demonstrative embodiments, system 100 may include a control station 120 configured to control wireless communication nodes 102, 104, 106, 108, 110 and/or 112, e.g., as described in detail below.

In some demonstrative embodiments, control station 120 may include a wireless communication device including one or more antennas, and one or more wireless communication transceivers, e.g., as described below with reference to FIG. 4.

In some demonstrative embodiments, control station 120 may be configured to communicate with wireless communication nodes 102, 104, 106, 108, 110 and/or 112 over the second frequency band. For example, control node 120 may be configured to communicate with wireless communication nodes 102, 104, 106, 108, 110 and/or 112 via a plurality of control links over the second frequency band, e.g., as described below.

In some demonstrative embodiments, control station 120 may include, or may be implemented as part of, a cellular base station, e.g., an LTE base station. In one example, control station 120 may perform the functionality of an eNB, for example, a macrocell eNB, or any other cellular node or base station.

In some demonstrative embodiments, control station 120 (also referred to as "macro base station") may be implemented as a dedicated entity, e.g., separate from nodes 102, 104, 106, 108, 110 and/or 112.

In other embodiments, control station 120 may be implemented as part of a wireless communication node of nodes 102, 104, 106, 108, 110 and 112. According to these embodiments, control station 120 may be configured to perform the functionality of control station 120, and the functionality of a wireless communication node of nodes 102, 104, 106, 108, 110 and 112. For example, control station 120 may be configured to communicate via one or more backhaul links over the first frequency band, e.g., as described below.

In some demonstrative embodiments, wireless communication nodes 102, 104, 106, 108, 110 and 112 may be configured to operate as backhaul nodes, which may form a backhaul network for communicating backhaul traffic between wireless communication nodes 102, 104, 106, 108, 110 and 112, e.g., as described below.

In some demonstrative embodiments, control station 120 may communicate with the backhaul nodes over a plurality of control links. For example, control station 120 may communicate with wireless communication node 102 via a control link 161; control station 120 may communicate with wireless communication node 104 via a control link 162; control station 120 may communicate with wireless communication node 106 via a control link 163; control station 120 may communicate with wireless communication node 108 via a control link 164; control station 120 may communicate with wireless communication node 110 via a control link 165; and/or control station 120 may communicate with wireless communication node 112 via a control link 166.

In some demonstrative embodiments, control links 161, 162, 163, 164, 165 and/or 166 may include links over the second frequency band, e.g., over the non-mmWave frequency band. In one example, control links 161, 162, 163, 164, 165 and/or 166 may include links over an LTE frequency band, e.g., the 2.4 GHz frequency band, or any other frequency band.

In some demonstrative embodiments, control links 161, 162, 163, 164, 165 and/or 166 may be configured for communicating control information between control station 120 and wireless communication nodes 102, 104, 106, 108, 110 and/or 112. For example, control station 120 may communicate with wireless communication nodes 102, 104, 106, 108, 110 and/or 112 control information for setting up and/or controlling communication over the backhaul network between wireless communication nodes 102, 104, 106, 108, 110 and/or 112, e.g., as described below.

In some demonstrative embodiments, the backhaul network may include a plurality of backhaul wireless communication links formed between wireless communication nodes 102, 104, 106, 108, 110 and/or 112. For example, wireless communication node 102 may communicate backhaul traffic with wireless communication node 104 over a wireless backhaul link 171; wireless communication node 104 may communicate backhaul traffic with wireless communication node 106 over a wireless backhaul link 172; wireless communication node 106 may communicate backhaul traffic with wireless communication node 108 over a wireless backhaul link 173; wireless communication node 108 may communicate backhaul traffic with wireless communication node 110 over a wireless backhaul link 174; and/or wireless communication node 110 may communicate backhaul traffic with wireless communication node 112 over a wireless backhaul link 175. Any other additional or alternative wireless backhaul links may be formed by any other pair of backhaul nodes.

In some demonstrative embodiments, backhaul links 171, 172, 173, 174 and/or 175 may include links over the first frequency band, e.g., over the mmWave frequency band.

In some demonstrative embodiments, wireless communication node 102 may communicate with mobile devices 132 of cell 130 via a plurality of wireless communication links ("access links"); wireless communication node 104 may communicate with mobile devices 136 of cell 134 via a plurality of access links; wireless communication node 106 may communicate with mobile devices 140 of cell 138 via a plurality of access links; wireless communication node 108 may communicate with mobile devices 144 of cell 142 via a plurality of access links; wireless communication node 110 may communicate with mobile devices 148 of cell 146 via a plurality of access links; and/or wireless communication node 112 may communicate with mobile devices 152 of cell 150 via a plurality of access links. An access link may include a downlink for communicating downlink data from a wireless communication node to a mobile device and/or an uplink for communicating uplink data from the mobile device to the wireless communication node.

In some demonstrative embodiments, the access links may include wireless communication links over the first frequency band, e.g., mmWave links. In other embodiments, the access links may include wireless communication links over the second frequency band, or any other frequency band.

Some demonstrative embodiments are described herein with reference to a wireless communication node, e.g., nodes 102, 104, 106, 108, 110 and/or 112, configured to perform the functionality of both a backhaul node, e.g., for communicating over the backhaul network, and an access node, for example, a cell base station, e.g., for communicating with the mobile devices of a wireless communication cell. For example, according to these embodiments, the wireless communication node may be implemented as part of a small cell base station. The small base station may be capable of communicating with the mobile devices over the access links, communicating with the other backhaul nodes via the backhaul links, and communicating with the control station via the control links.

However, in other embodiments the backhaul node and the access node may be implemented as two separate entities. For example, a wireless communication node, e.g., wireless communication node 102, 104, 106, 108, 110 and/or 110, may perform the functionality of a backhaul node, e.g., for communicating over the backhaul network; and a separate access node may be utilized for communicating with the mobile devices of a wireless communication cell. For example, according to these embodiments, the small cell base station may be capable of communicating with the mobile devices over the access links, and the backhaul node may be capable of communicating with the other backhaul nodes via the backhaul links, and communicating with the control station via the control links. According to this example, the backhaul node may interface between the small cell base station and the backhaul network.

In some demonstrative embodiments, the backhaul nodes may be capable of communicating over the backhaul and control links, e.g., simultaneously. For example, wireless communication node 102 may simultaneously communicate over control link 161 and backhaul link 171; wireless communication node 104 may simultaneously communicate over control link 162 and backhaul links 171 and/or 172; wireless communication node 106 may simultaneously communicate over control link 163 and backhaul links 172 and/or 173; wireless communication node 108 may simultaneously communicate over control link 164 and backhaul links 173 and/or 174; wireless communication node 110 may simultaneously communicate over control link 165 and backhaul links 174 and/or 175; and/or wireless communication node 112 may simultaneously communicate over control link 166 and backhaul link 175.

In some demonstrative embodiments, backhaul links 171, 172, 173, 174 and/or 175 may be utilized for direct or indirect communication between wireless communication nodes 102, 104, 106, 108, 110 and/or 112.

In some demonstrative embodiments, backhaul links 171, 172, 173, 174 and/or 175 may be utilized for communicating between the wireless communication nodes and a core network.

In some demonstrative embodiments, system 100 may include one or more backhaul nodes ("source/sink nodes") connected to a core network. For example, the source/sink nodes may perform the functionality of one or more "end points" where wireless traffic is concentrated and delivered to/from the core (wired/fiber) network. The core network may include, for example, a telephone network, the Internet, a Local Area Network (LAN), and the like.

In some demonstrative embodiments, at least one of wireless communication nodes 102, 104, 106, 108, 11 and 112 may be connected to the core network, and one or more other wireless communication nodes may communicate with the core network via the wireless backhaul links.

For example, as shown in FIG. 1, wireless communication node 106 may include at least one network interface 107 configured to communicate with at least one core network via one or more wired and/or wireless connections, e.g., via a wire, a cable, a fiber, an optic connection, and the like. For example, network interface 107 may include a modulator-demodulator (Modem), a Cable Modem, a router, and the like.

In some demonstrative embodiments, the core network may optionally be configured to enable communication between one or more elements of the backhaul network, e.g., over a wired connection.

In some demonstrative embodiments, backhaul links 171, 172, 173, 174 and/or 175 may include high-throughput links, which may be configured to communicate high throughput data between wireless communication nodes 102, 104, 106, 108, 110 and/or 112 and the core network, e.g., via node 106.

In some demonstrative embodiments, backhaul links 171, 172, 173, 174 and/or 175 may be utilized, for example, for systems including a relatively high density of nodes per area unit, e.g., in a deployment of a large number of cells, e.g., small-cells.

In some demonstrative embodiments, control station 120 may be implemented as part of a cellular node, e.g., an eNB, having a relatively large coverage area ("macro coverage area") 180, e.g., the elliptic coverage area shown in FIG. 1 or any other coverage area. A plurality of small cells, e.g., cells 130, 134, 138, 142, 146 and 150, may be deployed within coverage area 180.

In some demonstrative embodiments, control station 120 may control wireless communication nodes 102, 104, 106, 108, 110 and/or 112 in a centralized manner, e.g., over control links 161, 162, 163, 164, 165 and/or 166.

In some demonstrative embodiments, control station 120 may control wireless communication nodes 102, 104, 106, 108, 110 and/or 112, e.g., via control links 161, 162, 163, 164, 165 and/or 166, to form wireless backhaul links 171, 172, 173, 174 and/or 175 according to any backhauling scheme ("backhaul connectivity map" or "routing map"). For example, the backhaul routing map may define and/or configure one or more backhaul links to be formed by a backhaul node, e.g., as described below.

In some demonstrative embodiments, control station 120 may define and/or configure the backhaul routing map, for example, based on communications between control station 120 and one or more of wireless communication nodes 102, 104, 106, 108, 110 and 112, e.g., via control links 161, 162, 163, 164, 165 and/or 166.

In some demonstrative embodiments, control station 120 may communicate with a wireless communication node, e.g., wireless communication node 102, via a control link, e.g., control link 161, a request for connectivity information corresponding to the wireless communication node. The connectivity information may include, for example, information relating to an ability of the wireless communication node to connect to one or more other wireless communication nodes, e.g., wireless communication node 104, via one or more wireless backhaul links, e.g., backhaul link 171, the ability of the wireless communication node to connect to a core network, information relating to a coverage of the wireless communication node, information relating to an ability of the wireless communication node to communicate over the first frequency band, information relating to a number of backhaul links, e.g., beamformed links wireless communication node is capable of forming, information relating to a location of the wireless communication node, and/or any other information.

In some demonstrative embodiments, control station 120 may define the backhaul connectivity map, for example, based on the connectivity information received from wireless communication nodes 102, 104, 106, 108, 1100 and/or 110.

For example, control station 120 may define the backhaul connectivity map to include backhaul links 171, 172, 173, 174 and/or 175, as shown in FIG. 1.

In some embodiments, control station 120 may define the backhaul connectivity map such that, for example, a wireless communication node, e.g., each wireless communication node, of nodes 102, 104, 106, 108, 110 and/or 112 may be able to communicate backhaul traffic with the core network, e.g., via at least one backhaul path (route) between the wireless communication node and the core network. The backhauling path may be formed of one or more wireless backhaul links ("hops"). One or more wireless communication nodes may be connected to the core network via a single backhaul link ("single hop"), and/or one or more wireless communication nodes may be connected to the core network via multiple backhaul links ("multi-hop")

For example, as shown in FIG. 1, wireless communication node 102 may communicate with the core network via a backhauling path including backhauling links 171 and 172, and backhaul interface 107; wireless communication node 104 may communicate with the core network via a backhauling path including backhauling link 172, and backhaul interface 107; wireless communication node 106 may directly communicate with the core network via backhaul interface 107; wireless communication node 108 may communicate with the core network via a backhauling path including backhauling link 173, and backhaul interface 107; wireless communication node 110 may communicate with the core network via a backhauling path including backhauling links 174 and 173, and backhaul interface 107; and/or wireless communication node 112 may communicate with the core network via a backhauling path including backhauling links 175, 174 and 173, and backhaul interface 107.

In some demonstrative embodiments, the backhaul routing map may define more than one backhauling route for a wireless communication node, e.g., as described below with reference to FIG. 2. Connecting a wireless communication node to the core network via a plurality backhauling paths may provide redundancy, for example, to enable maintaining backhaul connectivity, e.g., if one or more of the backhaul links are blocked, lost or disrupted.

In some demonstrative embodiments, control station 120 may communicate control information with a wireless communication node, e.g., wireless communication node 102, over a control link, e.g., control link 161. The control information may include information defining one or more backhaul links to be formed between the wireless communication node and one or more other wireless communication nodes e.g., according to the routing map. For example, control station 120 may transmit control information to wireless communication node 102 over control link 161, the control information defining for wireless communication node to establish and/or communicate backhaul traffic over backhaul link 171.

In some demonstrative embodiments, control station 120 may utilize various optimization algorithms for traffic routing and scheduling the communication of the backhaul traffic over the wireless backhaul links. For example, control station 120 may configure the connectivity map to optimize total throughput over the backhaul network, and/or to optimize any other metric, e.g., a Quality of Service (QoS) metric. Different QoS metrics may be applied with respect to different small cells.

In some demonstrative embodiments, backhaul links 171, 172, 173, 174 and/or 175 may include a half-duplex link for communicating traffic in both directions between a pair of wireless communication nodes, but not simultaneously, e.g., only one direction at a time. In one example, communication over the half-duplex link may be managed according to a suitable Time Division Duplexing (TDD) scheme or any other half-duplex scheme.

In some demonstrative embodiments, backhaul links 171, 172, 173, 174 and/or 175 may include a full-duplex link for communicating traffic in both directions between a pair of wireless communication nodes, e.g., simultaneously. In one example, communication over the full-duplex link may be managed according to a suitable Frequency Division Duplexing (FDD) scheme or any other full-duplex scheme.

In some demonstrative embodiments, system 100 may include a control station, e.g., control station 120, configured to control a plurality of backhaul nodes, e.g., nodes 102, 104, 106, 108, 110 and/or 112, which may communicate over a backhaul network formed by wireless backhaul links, e.g., backhaul links 171, 172, 173, 174 and/or 175, between the backhaul nodes.

In some demonstrative embodiments, a control station may be configured to also perform the functionality of a backhaul node or a backhaul source/sink node, e.g., if the control station is capable of communicating over the first frequency band, e.g., as described below with reference to FIG. 2.

In some demonstrative embodiments, a system, system 100, may include a source/sink backhaul node, e.g., backhaul node 106, configured to interface between a core network and one or more other backhaul node.

In some demonstrative embodiments, the system may include more than one source/sink backhaul node, e.g., as described below with reference to FIG. 3.

Figure 2:
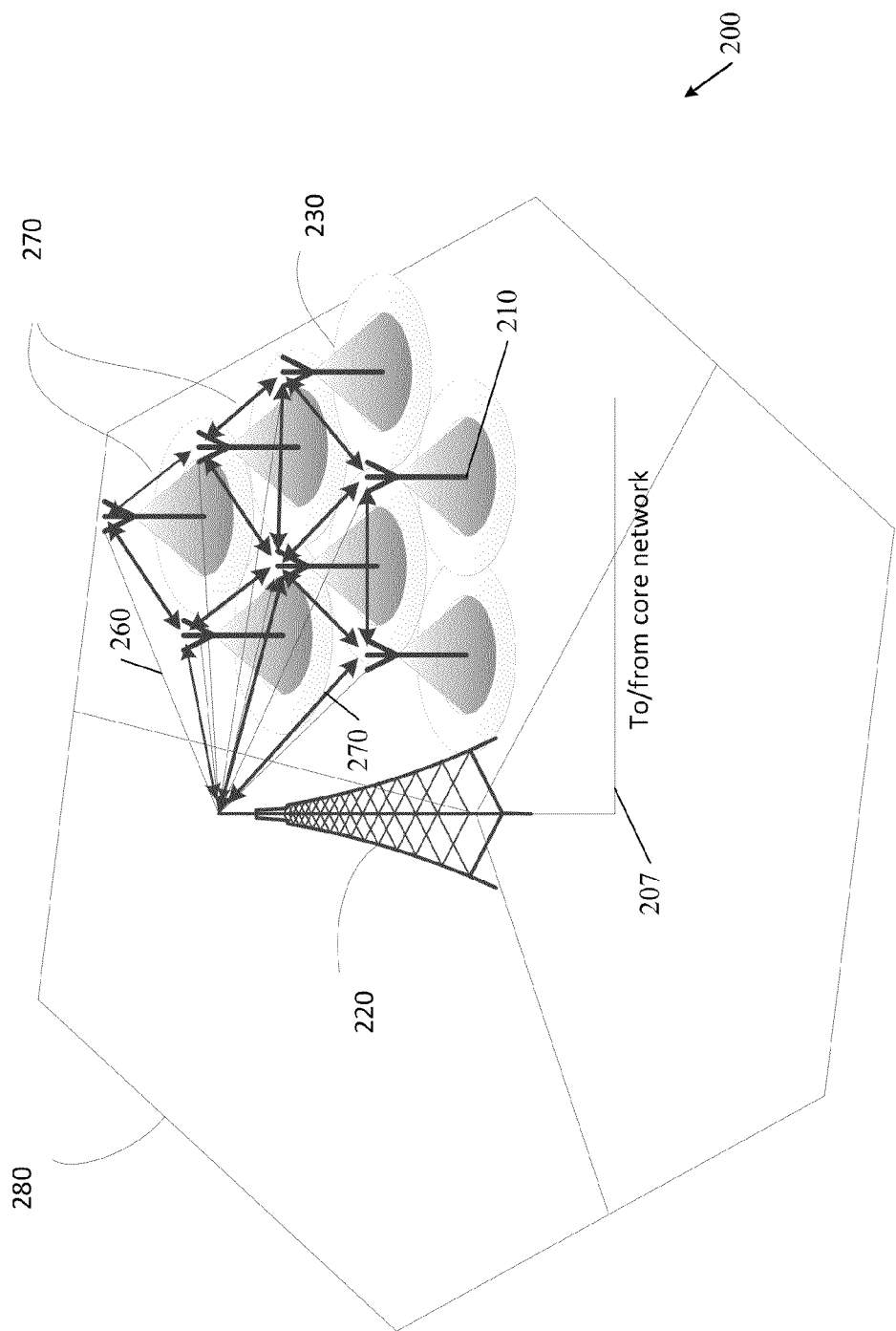
FIG. 2 is a schematic block diagram illustration of another deployment of a multi-cell wireless communication system, in accordance with some demonstrative embodiments.

FIG. 2 is a schematic block diagram illustration of another deployment of a multi-cell wireless communication system 200, in accordance with some demonstrative embodiments.

In some demonstrative embodiments, system 200 may include a control station 220 having a relatively large coverage area ("macro coverage area") 280. A plurality of small cells, e.g., cells 230, may be deployed within coverage area 280.

In some demonstrative embodiments, control station 220 may perform the functionality of a cellular base station, for example, an eNB, e.g., a macrocell eNB, or any other cellular node.

In some demonstrative embodiments, system 200 may include a plurality of backhauling nodes 210 deployed within small cells 230. In one example, backhauling nodes 210 may be implemented as part of small cell base-stations of cells 230, e.g., as described above. For example, a backhauling node 210 may be implemented as part of a pico eNB, or any other cellular base station.

In some demonstrative embodiments, backhauling nodes 210 may communicate backhaul data over a backhaul network, e.g., a dual band backhaul network, including a plurality of backhaul links 270 between backhaul nodes 210, e.g., over the first frequency band, and a plurality of control links 260 between control station 220 and backhauling nodes 210, over the second frequency band.

In some demonstrative embodiments, backhaul links 270 may perform the functionality of the wireless backhaul links described above with reference to FIG. 1, and/or control links 260 may perform the functionality of the wireless control links described above with reference to FIG. 1.

In some demonstrative embodiments, control station 220 may be configured to communicate backhaul traffic with backhauling nodes 210, e.g., via one or more of backhaul links 270 of the backhaul network. For example, control station 220 may be capable of communicating over the first frequency band, e.g., the mmWave frequency band. According to these embodiments, control station 220 may perform the functionality of a backhauling node 210, e.g., in addition to the functionality of a control station.

In some demonstrative embodiments, control station 220 may perform the functionality of a source/sink backhaul node. For example, control station 210 may include a network interface 207 to connect control station 220 to a core network, e.g., as described above.

In some demonstrative embodiments, control station 220 may communicate with backhaul nodes 210, e.g., via control links 260, to define a backhaul connectivity map; and may control backhaul nodes 210, e.g., via control links 260, to establish wireless backhaul links 270 according to the backhaul connectivity map, e.g., as described above with reference to FIG. 1.

In some demonstrative embodiments, one or more of backhaul nodes 210 may communicate backhaul traffic with the core network via a single-hop, e.g., via a direct backhaul link 270 with control station.

In some demonstrative embodiments, one or more of backhaul nodes 210 may communicate backhaul traffic with the core network via a multi-hop, e.g., via one or more backhaul links with one or more other backhaul nodes 210.

In some demonstrative embodiments, as shown in FIG. 2, a backhaul node 210 may communicate with the core network via more than one backhauling path, e.g., via a single-hop backhauling path, and one or more multi-hop backhauling paths.

In some demonstrative embodiments, control station 220 may configure the connectivity map to define for a backhaul node 210 one or more alternative backhauling paths, which may be used, e.g., as a backup path for a backhaul path being used by the backhaul node 210 ("the current path"). The backup paths may be used, for example, in case of failure of one or more backhaul links 270 and/or backhaul nodes 210 along the current path.

Figure 3:
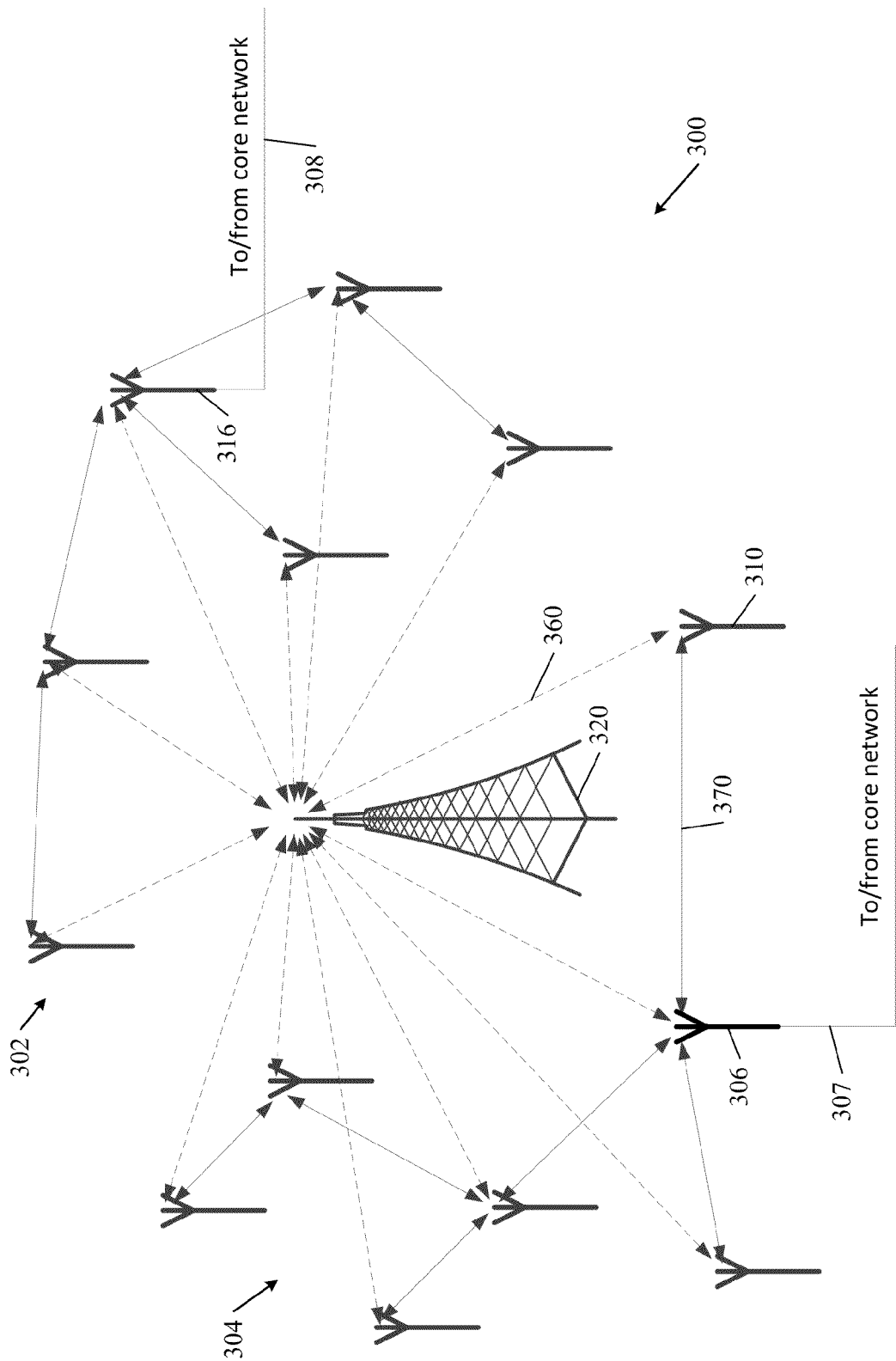
FIG. 3 is a schematic block diagram illustration of another deployment of a multi-cell wireless communication system, in accordance with some demonstrative embodiments.

FIG. 3 is a schematic block diagram illustration of another deployment of a multi-cell wireless communication system 300, in accordance with some demonstrative embodiments.

In some demonstrative embodiments, system 300 may include a control station 320 to control a plurality of backhaul nodes 310, e.g., of a plurality of small cells, which may be deployed within a coverage area of control station, e.g., as described above.

In some demonstrative embodiments, control station 320 may perform the functionality of a cellular base station, for example, an eNB, e.g., a macrocell eNB, or any other cellular node.

In some demonstrative embodiments, backhauling nodes 310 may communicate backhaul data over a backhaul network, e.g., a dual band backhaul network, including a plurality of backhaul links 370 between backhaul nodes 310, e.g., over the first frequency band, and a plurality of control links 360 between control station 320 and backhauling nodes 310, over the second frequency band.

In some demonstrative embodiments, backhaul links 370 may perform the functionality of the wireless backhaul links described above with reference to FIG. 1, and/or control links 360 may perform the functionality of the wireless control links described above with reference to FIG. 1.

In some demonstrative embodiments, system 300 may include a plurality of source/sink backhaul nodes. For example, as shown in FIG. 3, system 300 may include a source/sink backhaul node 306 having a connection 307 to a core network, and a source/sink backhaul node 316 having a connection 308 to a core network, e.g., the same core network or a different core network.

In some demonstrative embodiments, the plurality of source/sink backhaul nodes may be utilized, for example, for optimizing one or more attributes of the backhaul network.

In some demonstrative embodiments, the plurality of source/sink backhaul nodes may be utilized for forming a plurality of backhaul sub-networks.

In one example, a first backhaul sub-network 302 may include a first plurality of backhaul nodes 310, which may be connected, via backhaul links 370, to source/sink backhaul node 316. A second backhaul sub-network 304 may include a second plurality of backhaul nodes 310, which may be connected, via backhaul links 370, to source/sink backhaul node 306.

In some demonstrative embodiments, control station 320 may define the backhaul sub-networks in a centralized manner, e.g., as described above.

In some demonstrative embodiments, control station may communicate to the backhaul nodes of sub-network 302, e.g., via control links 360, control information defining backhaul links 370 according to a connectivity map of sub-network 302. Control station may communicate to the backhaul nodes of sub-network 304, e.g., via control links 360, control information defining backhaul links 370 according to a connectivity map of sub-network 304.

In some demonstrative embodiments, control station 320 may assign a backhaul node 310 to more than one backhaul sub-network. According to these embodiments, control station 320 may provide the backhaul node 310 with control information defining backhaul links 370 over both sub-networks 302 and 304.

Figure 4:
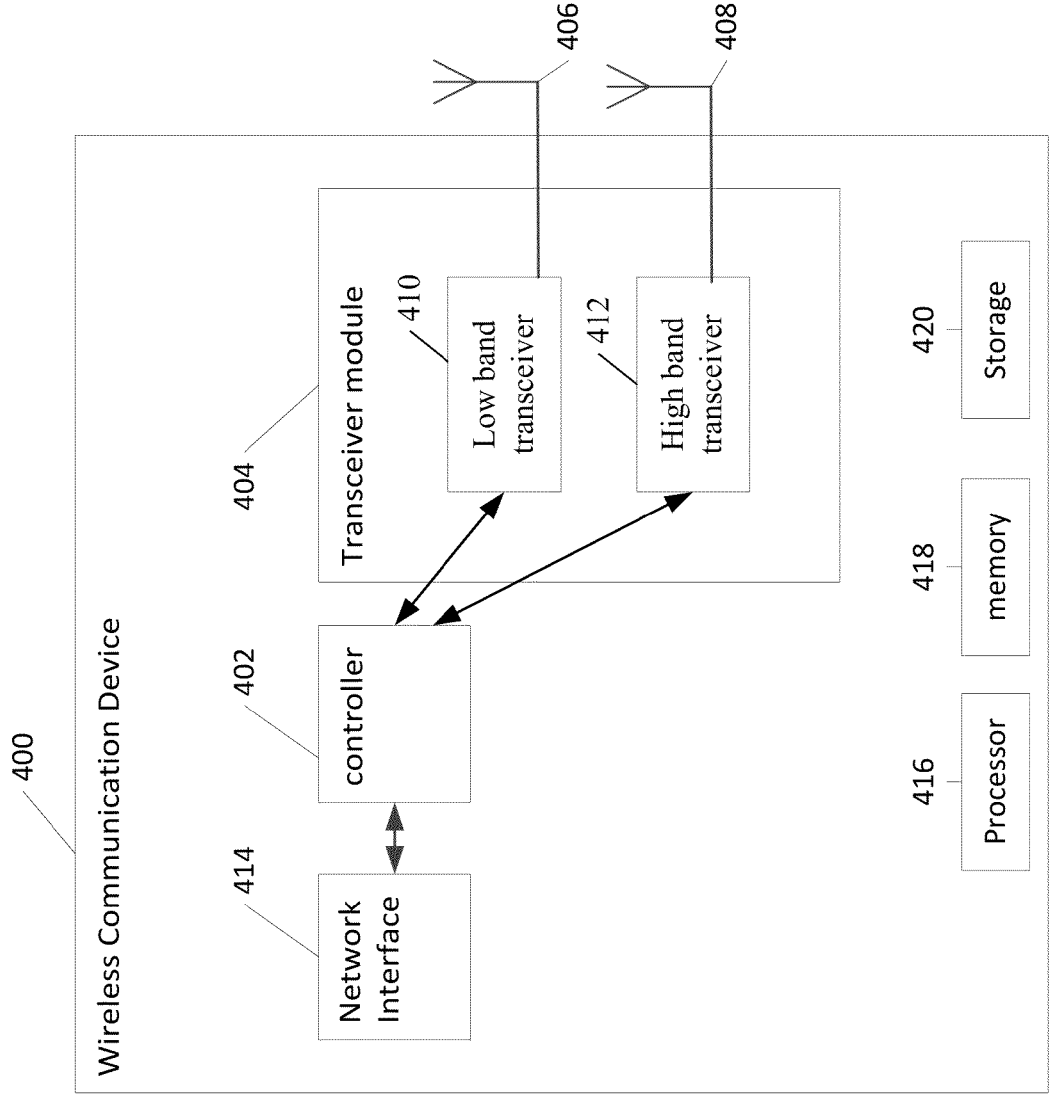
FIG. 4 is a schematic block diagram illustration of a wireless communication device, in accordance with some demonstrative embodiments.

Reference is made to FIG. 4, which schematically illustrates a wireless communication device 400, in accordance with some demonstrative embodiments.

In some demonstrative embodiments, wireless communication device 400 may include a transceiver module 404 to perform wireless communication between wireless communication device 400 and one or more other wireless communication devices, e.g., as described above.

In some demonstrative embodiments, wireless communication device 400 may perform the functionality of a wireless communication node, e.g., nodes 102, 104, 106, 108, 110 and/or 112 (FIG. 1), a backhaul node 210 (FIG. 2), and/or a backhaul node 310 (FIG. 3).

According to these embodiments, transceiver module 404 may include a dual-band transceiver module configured to communicate over the first frequency band, e.g., for communicating over the wireless backhaul links, and over the second frequency band, e.g., for communicating over the control links with the control station.

In one example, transceiver module 404 may include at least one low-band transceiver 410, e.g., to communicate over the second frequency band, and at least one high-band transceiver 412 to communicate over the first frequency band. For example, transceiver 410 may perform the functionality of a cellular transceiver, e.g., an LTE transceiver, to communicate over a non-mmWave frequency band, e.g., the 2.4 GHz frequency band or any other frequency band. For example, transceiver 412 may perform the functionality of a mmWave transceiver, e.g., a WiGig or IEEE 802.11ad transceiver, to communicate over a mmWave frequency band, e.g., the 60 GHz frequency band or any other frequency band.

In some demonstrative embodiments, wireless communication device 400 may perform the functionality of a control station, e.g., control station 120 (FIG. 1), control station 220 (FIG. 2), and/or control station 320 (FIG. 3).

In some demonstrative embodiments, wireless communication device 400 may perform the functionality of a control station, e.g., control station 120 (FIG. 1) or control station 320 (FIG. 3), capable of communicating over the control links. According to these embodiments, transceiver module 404 may include low-band transceiver 410 to communicate over the first frequency band, e.g., for communicating over the control links.

In some demonstrative embodiments, wireless communication device 400 may perform the functionality of a control station, e.g., control station 220 (FIG. 2), capable of communicating over the backhaul links. According to these embodiments, transceiver module 404 may include the dual-band transceiver module configured to communicate over the first frequency band, e.g., for communicating over the wireless backhaul links, and over the second frequency band, e.g., for communicating over the control links with the control station. In one example, transceiver module 404 may include both low-band transceiver 410 and high-band transceiver 412, e.g., as described above.

In some demonstrative embodiments, transceivers 404, 410 and/or 412 may include one or more radios, e.g., including one or more wireless transmitters, receivers and/or transceivers able to send and/or receive wireless communication signals, RF signals, frames, blocks, transmission streams, packets, messages, data items, and/or data.

In some demonstrative embodiments, transceiver module 404 may include, or may be associated with, one or more antennas. In one example, transceiver 410 may be associated with one or more antennas 406; and/or transceiver 412 may be associated with one or more antennas 408.

Antennas 406 and/or 408 may include any type of antennas suitable for transmitting and/or receiving wireless communication signals, blocks, frames, transmission streams, packets, messages and/or data. For example, antennas 406 and/or 408 may include any suitable configuration, structure and/or arrangement of one or more antenna elements, components, units, assemblies and/or arrays. Antennas 406 and/or 408 may include, for example, antennas suitable for directional communication, e.g., using beamforming techniques. For example, antennas 408 may include a phased array antenna, a multiple element antenna, a set of switched beam antennas, and/or the like. In some embodiments, antennas 406 and/or 408 may implement transmit and receive functionalities using separate transmit and receive antenna elements. In some embodiments, antennas 406 and/or 408 may implement transmit and receive functionalities using common and/or integrated transmit/receive elements.

In some demonstrative embodiments, wireless communication device 400 may also include a wireless communication controller 402 configured to control transceiver module 404, e.g., according to the functionality of wireless communication device 400.

In one example, controller 402 may control transceiver module 404 to perform the functionality of a control station, for example, control station 120 (FIG. 1), control station 220 (FIG. 2), and/or control station 320 (FIG. 3), e.g., as described above.

In another example, controller 402 may control transceiver module 404 to perform the functionality of a wireless communication node, e.g., a backhaul node, for example, nodes 102, 104, 106, 108, 110 and/or 112 (FIG. 1), a backhaul node 210 (FIG. 2), and/or a backhaul node 310 (FIG. 3), e.g., as described above.

In some demonstrative embodiments, wireless communication device 400 may also include, for example, one or more of a processor 416, a memory unit 418, and a storage unit 420. Wireless communication device 400 may optionally include other suitable hardware components and/or software components. In some demonstrative embodiments, some or all of the components of wireless communication device 400 may be enclosed in a common housing or packaging, and may be interconnected or operably associated using one or more wired or wireless links. In other embodiments, components of wireless communication device 400 may be distributed among multiple or separate devices.

Processor 416 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 416 executes instructions, for example, of an Operating System (OS) of wireless communication device 400 and/or of one or more suitable applications.

Memory unit 418 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 420 includes, for example, a hard disk drive, a floppy disk drive, a Compact Disk (CD) drive, a CD-ROM drive, a DVD drive, or other suitable removable or non-removable storage units. Memory unit 418 and/or storage unit 410, for example, may store data processed by wireless communication device 400.

In some demonstrative embodiments, wireless communication device 400 may utilize a common antenna, e.g., a common antenna array, to communicate over a plurality of wireless communication links, e.g., a plurality of wireless backhaul links, as described below.

In some demonstrative embodiments, antennas 408 may include an antenna array including a plurality of antenna elements. The plurality of antenna elements of the antenna array may be configured, for example, for creation of a plurality of highly-directional antenna patterns. The plurality of antenna elements may include, for example, about 16-36 antenna elements, or any other number of antenna elements, which may be placed in a predefined geometry. The plurality of antenna elements may be configured to form a plurality of highly directive antenna patterns or beams, which may be steered by setting appropriate signal phases at the antenna elements, e.g., as described below.

In some demonstrative embodiments, controller 402 may be configured to control antennas 408 to generate and steer the plurality of beams to be directed to a plurality of other devices, e.g., other backhaul nodes. For example, wireless communication device 400 may steer the plurality of beams to communicate with a plurality of wireless backhaul nodes via a plurality of wireless backhaul links over the plurality of beams formed by antennas 408. In one example, node 108 (FIG. 1) may include controller 402 to control antennas 408 to form a first beam directed to node 110 (FIG. 1) for communicating with node 110 (FIG. 1) over backhaul link 174 (FIG. 1), and a second beam directed to node 106 (FIG. 1) for communicating with node 106 (FIG. 1) over backhaul link 173 (FIG. 1).

In other embodiments, wireless communication device 400 may utilize a plurality of separate antennas, e.g., antenna arrays, to communicate over the plurality of wireless communication links, e.g., the plurality of wireless backhaul links.

Following is a description of a modular antenna array, which may be utilized by wireless communication device 400, in accordance with some demonstrative embodiments. In other embodiments, any other suitable antenna array may be used. For example, the modular antenna array may perform the functionality of antenna 408. In some demonstrative embodiments, the modular antenna array may also perform shared MIMO and/or beamforming processing for a plurality of beams.

In some demonstrative embodiments, an antenna array may include a modular architecture configured to synthesize larger composite antenna arrays from smaller sub-array antenna modules. A combination of RF beamforming in the sub-array antenna modules and central beamforming between sub-array antenna modules, which may be implemented, e.g., in a baseband, an intermediate frequency, and/or an RF chain, may provide, for example, increased beamforming capabilities, for example, in terms of beam width, gain, coverage and beam steering. The antenna array may be configured, for example, to operate in the mmWave region of the RF spectrum and, in particular, the 60 GHz region associated with the use of, for example, wireless personal area network (WPAN) and wireless local area network (WLAN) communication systems.

Figure 5:
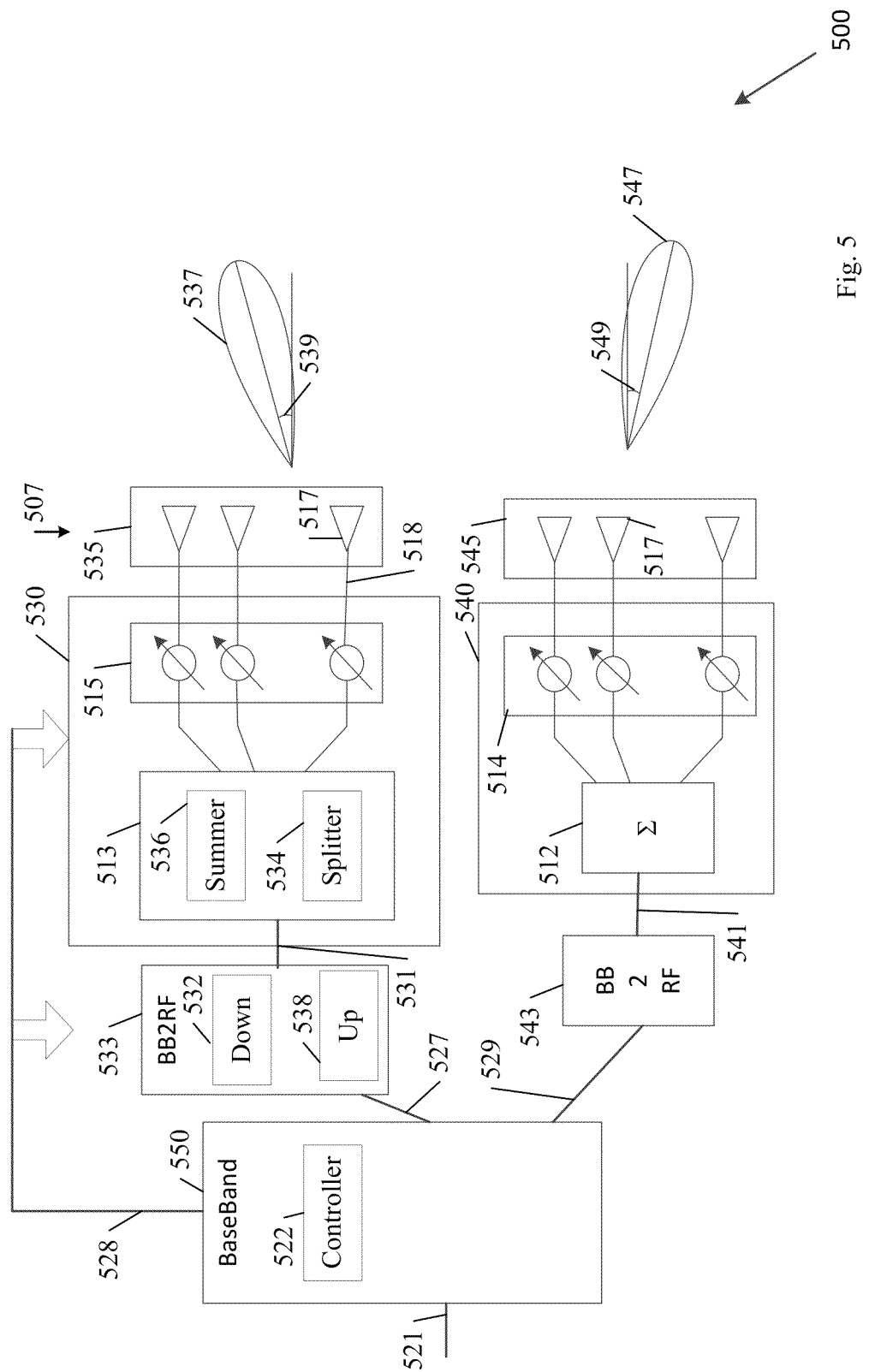
FIG. 5 is a schematic illustration of a modular antenna array, in accordance with some demonstrative embodiments.

Reference is now made to FIG. 5, which schematically illustrates a modular antenna array 500, in accordance with some demonstrative embodiments.

In some demonstrative embodiments, modular antenna array 500 may perform the functionality of antennas 408 (FIG. 4).

In some demonstrative embodiments, modular antenna array 500 may include at least one antenna array 507 including a plurality of antenna elements 517. The plurality of antenna elements 517 may be configured, for example, for creation of a highly directional antenna pattern. The plurality of antenna elements 517 may include, for example, about 16-36 antenna elements, or any other number of antenna elements, which may be placed in a predefined geometry. The plurality of antenna elements 517 may be configured to form a plurality of highly directive antenna patterns or beams, which may be steered by setting appropriate signal phases at antenna elements 517, e.g., as described below.

In some demonstrative embodiments, antenna array 507 may include a plurality of antenna subarrays. For example, antenna array 507 may include a first antenna subarray 535, and a second antenna subarray 545. In other embodiments, antenna array 507 may include any other number of antenna subarrays, e.g., more than two antenna subarrays.

The phrase "antenna subarray" as used herein may relate to a group of antenna elements of the plurality of antenna elements 517, which may be coupled, for example, to a common RF chain. In one example, antennas 507 may include an antenna array, which may be divided into a plurality of, e.g., independent subarrays, each capable of independently generating a directional beam. In another example, antennas 507 may include a plurality of different antenna arrays to generate a plurality of directional beams. In another example, antennas 507 may include two or more different antenna arrays. One or more of the different antenna arrays may be divided into two or more subarrays.

In some demonstrative embodiments, first antenna subarray 535 may include a first plurality of antenna elements of the plurality of antenna elements 517 configured to form a first directional beam 537 directed in a first direction 539.

In some demonstrative embodiments, second antenna subarray 545 may include a second, e.g., different, plurality of antenna elements of the plurality of antenna elements 517 configured to form a second directional beam 547 directed in a second direction 549.

Some demonstrative embodiments are described herein with respect to a modular antenna array, e.g., modular antenna array 500, including two sub-arrays, e.g., antenna sub-arrays 535 and 545, configured to form two directional beams. However, other embodiments, the modular antenna array may include any other plurality of antenna-sub-arrays to form any other plurality of directional beams.

In some demonstrative embodiments, modular antenna array 500 may include a plurality of Radio Frequency (RF) chains configured to control the first and second pluralities of antenna elements of antenna subarrays 535 and 545.

In some demonstrative embodiments, the plurality of RF chains may be coupled to the plurality of antenna subarrays. For example, modular antenna array 500 may include a first RF chain 530 connected to first antenna subarray 535, and a second RF chain 540 connected to second antenna subarray 545. In other embodiments, modular antenna array 500 may include any other number of RF chains coupled to the any other number of the plurality of antenna subarrays, e.g., more than two RF chains connected to more than two antenna subarrays.

In some demonstrative embodiments, RF chains 530 and/or 540 may include or may be included as part of a radio frequency integrated circuit (RFIC), which may be connected to antenna subarrays 535 and 545 through a plurality of feed lines 518, which may be, for example, micro-strip feed lines.

In some demonstrative embodiments, the plurality of RF chains may enable processing of two or more independent RF signals, e.g., carrying different data. For example, RF chain 530 may process an RF signal 531, and RF chain 540 may process an RF signal 541.

In some demonstrative embodiments, RF chain 530 may include a plurality of phase shifters 515 configured to adjust the phases of the antenna elements of antenna subarray 535. For example, a phase shifter of phase shifters 515 may be configured to adjust a corresponding antenna element of antenna subarray 535.

For example, phases of the antenna elements of antenna subarrays 535 may be shifted, e.g., by phase shifters 515, to provide a constructive and/or destructive interference, configured to change the beamforming scheme of antenna subarray 535 and to change the direction of directional beam 537.

In some demonstrative embodiments, RF chain 540 may include a plurality of phase shifters 514 configured to adjust the phases of the antenna elements of antenna subarray 545. For example, a phase shifter of phase shifters 514 may be configured to adjust a corresponding antenna element of antenna subarray 545.

For example, phases of the antenna elements of antenna subarrays 545 may be shifted, e.g., by phase shifters 514, to provide a constructive and/or destructive interference, configured to change the beamforming scheme of antenna subarray 545 and to change the direction of directional beam 547.

Phase shifters 515 and/or 514 may be discrete, e.g., configured to rotate the phase of the antenna elements of antenna subarrays 535 and/or 545 to a limited set of values, for example, 0, $\pm\pi/2$, and $\pi$, allowing only a relatively coarse beamforming for changing a direction of directional beams 537 and/or 547.

In some demonstrative embodiments, RF chain 530 may include a summer/splitter block 513 coupled to phase shifters 515 and/or RF chain 540 may include a summer/splitter block 512 coupled to phase shifters 514.

In some demonstrative embodiments, summer/splitter block 513 may include a splitter 534, e.g., a multiplexer, configured to reproduce and split RF signal 531 between the antenna elements of antenna subarray 535 and to couple the reproduced signals of RF signal 531 to phase shifters 515, e.g., when transmitting RF signal 531 via beam 537.

In some demonstrative embodiments, summer/splitter block 513 may include a summer 536 configured to sum into RF signal 531 signals received from the antenna elements of antenna subarray 535, e.g., when receiving RF signal 531 via beam 537.

In some demonstrative embodiments, utilizing two or more RF chains may enable baseband processing of two or more independent signals, e.g., carrying different data, communicated via two or more directional beams. In contrast, utilizing a single RF chain may enable baseband processing of only one signal, e.g., even if a large number of antenna elements 517 are utilized.

For example, RF chains 530 and 540 may enable baseband processing, e.g., independent baseband processing, of RF signals 531 and 541 communicated via directional beams 537 and 547.

In some demonstrative embodiments, RF signal 531 may include data communicated by a backhaul node, e.g., node 108 (FIG. 1), via a first wireless backhaul link, e.g., backhaul link 174 (FIG. 1), over beam 537, and RF signal 541 may include data communicated by the backhaul node via a second backhaul link, e.g., backhaul link 173 (FIG. 1), over beam 547.

In some demonstrative embodiments, modular antenna array 500 may utilize the two or more RF chains to perform beamformed diversity communication, e.g., as described below.

The phrase "beamformed diversity communication", as used herein may relate to any communication utilizing a plurality of beams.

In some demonstrative embodiments, modular antenna array 500 may include a baseband 550 configured to control antenna subarrays 535 and 545 to form directional beams 537 and 547 directed to directions 539 and 549 for communicating a MIMO wireless transmission.

In some demonstrative embodiments, baseband 550 may process input data 521 into the MIMO wireless transmission to be communicated utilizing a MIMO beamformed scheme, e.g., as described below.

In some demonstrative embodiments, input data 521 may include data to be communicated over one or more backhaul links, e.g., backhaul links 173 and/or 174 (FIG. 1).

Some demonstrative embodiments are described herein with reference to a wireless communication unit, e.g., modular antenna array 500, configured to perform both transmission and reception of a MIMO beamformed communication. Other embodiments may include a wireless communication unit capable of performing only one of transmission and reception of a MIMO beamformed communication.

Some demonstrative embodiments are described herein with reference to a communication system, e.g., wireless communication system 500, wherein both the TX side and the RX side utilize a plurality of antenna subarrays to communicate a MIMO transmission. However, other embodiments may be implemented with respect to systems configured to communicate any other diversity communication, for example, systems in which only one of the Tx and Rx sides utilizes a plurality of antenna subarrays, e.g., to form a Single-Input-Multi-Output (SIMO) and/or a Multi-Input-Single-Output (MISO) beamformed link. For example, one of the Tx and Rx sides may utilize an omni-directional antenna, and another one of the Tx and Rx sides may utilize a multi-array transceiver, e.g., modular antenna array 500.

In some demonstrative embodiments, modular antenna array 500 may include a plurality of baseband (BB) to RF (BB2RF) converters interfacing between the plurality of RF chains and baseband 550. For example, modular antenna array 500 may include BB2RF converters 533 interfacing between RF chain 530 and baseband 550, and BB2RF converters 543 interfacing between RF chain 540 and baseband 550. In other embodiments, modular antenna array 500 may include any other number of BB2RF convertors connecting between baseband 550 and any other number of RF chains, e.g., more than two.

In some demonstrative embodiments, BB2RF converter 533 may convert RF signal 531 into baseband data signal 527 and vice versa, and/or BB2RF converters 543 may convert RF signal 541 into baseband data signal 529 and vice versa.

In one example, BB2RF converter 533 may convert RF signal 531 into baseband data signal 527, and/or BB2RF converter 543 may convert RF signal 541 into baseband data signal 529, e.g., if modular antenna array 500 receives the MIMO wireless transmission via beams 537 and/or 547.

In another example, BB2RF converter 533 may convert baseband data signal 527 into RF signal 531 and/or BB2RF converter 543 may convert baseband data signal 529 into RF signal 541, e.g., if modular antenna array 500 transmits the MIMO wireless transmission via beams 537 and/or 547.

In some demonstrative embodiments, BB2RF converters 533 and/or 543 may include down-converters, configured to convert an RF signal into a baseband data signal, and to provide the baseband data signal to baseband 550, e.g., if modular antenna array 500 receives the MIMO wireless transmission.

For example, BB2Rf converter 533 may include a down converter 532 configured to down-convert RF signal 531 into data signal 527, and to provide data signal 527 to baseband 550.

In some demonstrative embodiments, baseband to RF converters 533 and/or 543 may include up-converters, configured to convert a baseband data signal into an RF signal and to provide the RF signal to an RF chain, e.g., if modular antenna array 500 transmits the MIMO wireless transmission.

For example, BB2RF converter 533 may include an up-converter 538 configured to up-convert data signal 527 into RF signal 531 and to provide RF signal 531 to RF chain 530.

In some demonstrative embodiments, modular antenna array 500 may be configured to perform hybrid beamforming. The hybrid beamforming may include, for example, performing a coarse beamforming in RF chains 530 and/or 540, e.g., using phase-shifters 539 and/or 549; and fine beamforming in baseband 550, e.g., as described below.

In one example, the coarse and/or fine beamforming may be performed, for example, as part of a beamforming procedure for setting up a beamformed link.

In some demonstrative embodiments, the fine beamforming may include diversity processing, e.g., MIMO processing, MISO processing and/or SIMO processing, at baseband 550. For example, the MIMO processing may include, for example, closed-loop (CL) MIMO processing, Open Loop (OL) MIMO processing, Space-Block Code (SBC) MIMO processing, e.g., Space Time Block Code (STBC) MIMO processing, Space Frequency Block Code (SFBC) MIMO processing, and the like.

In some demonstrative embodiments, modular antenna array 500 may include a controller 522 configured to control RF Chains 535 and 545 and baseband 550 to perform the coarse beamforming and/or the fine beamforming.

In some demonstrative embodiments, controller 522 may control antenna subarrays 535 and/or 545 utilizing a control signal 528 carrying the amount of phase shift to be applied to one or more phase shifters of phase shifters 515 and/or 514.

In some demonstrative embodiments, the phase shift adjustments to phase shifters 515 may determine and/or control the beam width, gain and/or direction of directional beam 537 formed by antenna subarray 535.

In some demonstrative embodiments, the phase shift adjustments to phase shifters 514 may determine and/or control the beam width, gain and/or direction of directional beam 547 forms by antenna subarray 545.

In some demonstrative embodiments, each phase shifter of an antenna element of antenna subarrays 535 and/or 545 may perform a local phase adjustment to a signal to create a local phase distribution in a desired beam direction.

In some demonstrative embodiments, control signal 528 may include weighting coefficients, which may be generated and/or derived from controller 522, configured to steer directional beams 537 and/or 547.

In some demonstrative embodiments, controller 522 may provide via control signal 528 a first set of weighting coefficients to phase shifters 515 configured to form a local phase adjustment to one or more antenna elements of antenna subarray 535, resulting in directing beam 537 to direction 539.

In some demonstrative embodiments, controller 522 may provide via control signal 528 a second, e.g., different set of weighting coefficients, to phase shifters 514 configured to form a local phase adjustment to one or more antenna elements of antenna subarray 545, resulting in directing beam 547 to direction 549.

In some demonstrative embodiments, a plurality of different signals may be communicated via a plurality of beamformed links formed by the plurality of beamformed beams. Each beamformed link, which corresponds to an antenna subarray of the plurality of antenna subarrays, may communicate a signal, for example, via a plurality of antenna elements of the antenna subarray.

For example, a first signal, e.g., signal 527, may be communicated via a first beamformed link formed by directional beam 537 generated by antenna subarray 535, and a second, e.g., different signal, for example, signal 529, may be communicated via a second beamformed link formed by directional beam 547 generated by antenna subarray 545.

In some demonstrative embodiments, modular antenna array 500 may be utilized by a node to form one or more independent directional communication beams. In one example, modular antenna array 500 may be utilized by node 108 (FIG. 1) to form a first directional beam for communicating over backhaul link 174 (FIG. 1), and to form a second directional beam for communicating over backhaul link 173 (FIG. 1).

Figure 6:
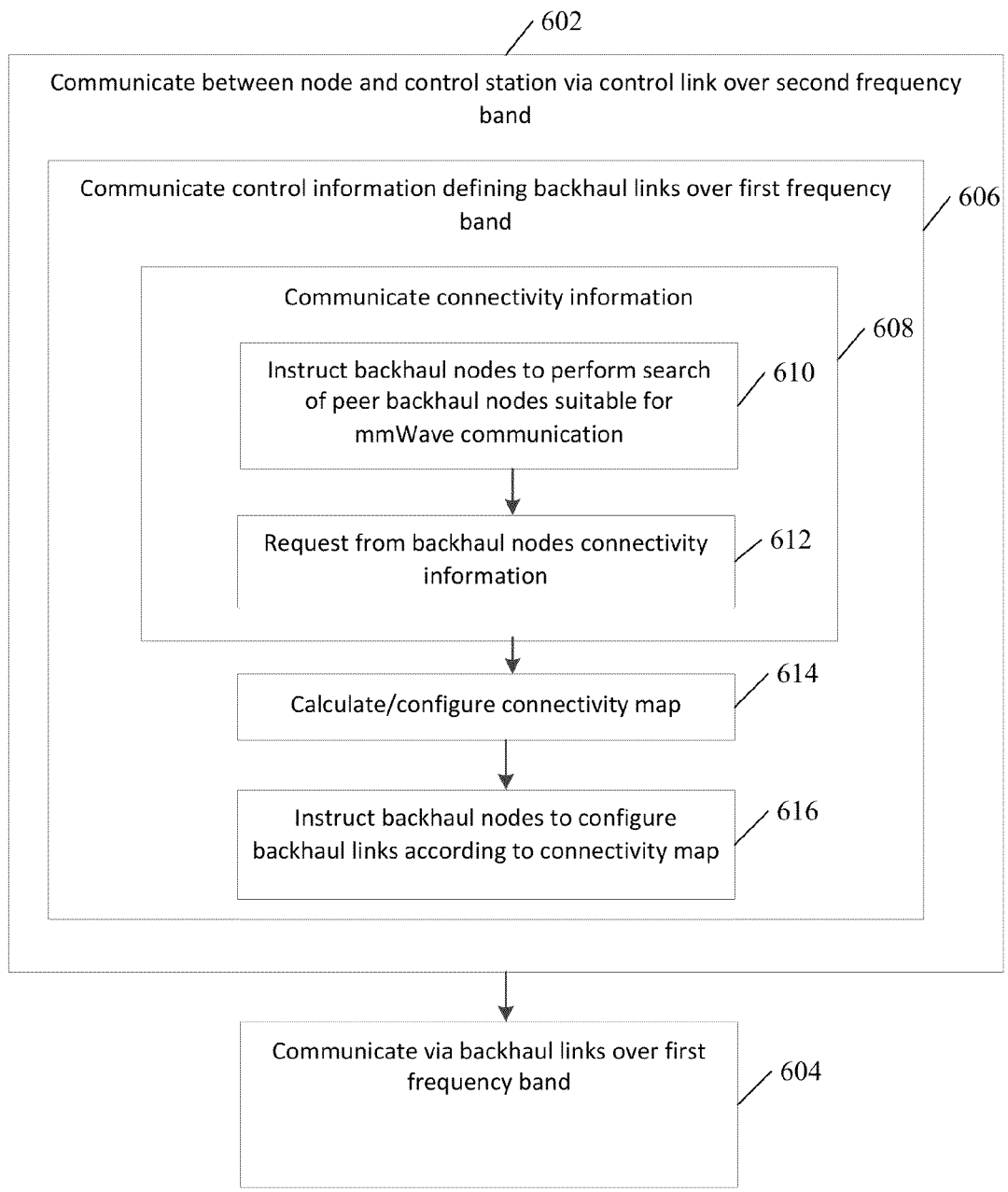
FIG. 6 is a schematic flow-chart illustration of a method of wireless backhaul communication, in accordance with some demonstrative embodiments.

Reference is made to FIG. 6, which schematically illustrates a method of wireless backhaul communication, in accordance with some demonstrative embodiments. For example, one or more of the operations of the method of FIG. 6 may be performed by a wireless communication system, e.g., system 100 (FIG. 1); a wireless communication node, e.g., nodes 102, 104, 106, 108, 110, 112 (FIG. 1), 210 (FIG. 2), and/or 310 (FIG. 3); a control station, e.g., control stations 120 (FIG. 1), 220 (FIG. 2) and/or 320 (FIG. 3); and/or a wireless communication device, e.g., wireless communication device 400 (FIG. 4).

In some demonstrative embodiments, one or more of the operations of the method of FIG. 6 may be implementing a dual-band backhaul network over first and second frequency bands. For example, the first frequency band may be greater than the second frequency band. In one example, the first frequency band may include a mmWave frequency band, and the second frequency band may include a non-mmWave frequency band, e.g., as described above.

As indicated at block 602, the method may include communicating between a wireless communication node and a control station via a control link over the second frequency band. For example, wireless communication node 102 (FIG. 1) may communicate with control station 120 (FIG. 1) via control link 161 (FIG. 1), e.g., as described above.

As indicated at block 604, the method may include communicating between a wireless communication node and one or more other wireless communication nodes via one or more backhaul links of a backhaul network over the first frequency band. For example, wireless communication node 102 (FIG. 1) may communicate with wireless communication node 104 (FIG. 1) via backhaul link 171 (FIG. 1), e.g., as described above.

As indicated at block 606, communicating over the control link may include communicating between the control station and the wireless communication node control information defining one or more backhaul links between the wireless communication node and one or more other wireless communication nodes according to a routing map for routing backhaul traffic via the backhaul links. For example, control station 120 (FIG. 1) may transmit over control link 161 (FIG. 1) control information defining the routing map to node 102 (FIG. 1), e.g., as described above.

As indicated at block 608, communicating the control information may include communicating connectivity information from the plurality of wireless communication nodes. For example, control station 120 (FIG. 1) may gather status information from the backhaul nodes, e.g., on/off status, mmWave band connectivity map information, traffic intensity through the nodes, and the like, e.g., as described above.

As indicated at block 610, communicating the connectivity information may include instructing the backhaul nodes to perform a search of peer backhaul nodes suitable for mmWave band communication. For example, control station 102 (FIG. 1) may instruct node 102 (FIG. 1), e.g., via control link 161 (FIG. 1), to search for one or more other nodes, e.g., node 104 (FIG. 1), which may be suitable for communicating over one or more backhaul links, e.g., as described above.

As indicated at block 612, communicating the connectivity information may include requesting the connectivity information from the backhaul nodes. For example, control station 120 (FIG. 1) may communicate via control link 161 (FIG. 1) a request from control station 120 (FIG. 1) to node 102 (FIG. 1) for connectivity information. The connectivity information may include, for example, information relating to an ability of wireless communication node 102 (FIG. 1) to connect to the one or more other wireless communication nodes over the backhaul links, and/or information relating to an ability of wireless communication node 102 (FIG. 1) to connect to a core network, e.g., as described above.

As indicated at block 614, communicating the control information may include calculating and/or configuring or reconfiguring the connectivity map defining the backhaul nodes to be established between the backhaul nodes. For example, control station 120 (FIG. 1) may configure the connectivity map between nodes 102, 104, 106, 108, 110 and/or 112 (FIG. 1) to include a plurality of backhaul links between specific pairs of nodes, e.g., to configure/optimize the mmWave backhaul network, e.g., based on the gathered connectivity information.

As indicated at block 616, communicating the control information may include instructing the backhaul nodes to configure wireless backhaul links in accordance with the connectivity map. For example, control station 120 (FIG. 1) may control node 102 (FIG. 1), e.g., via control link 161 (FIG. 1) to establish backhaul link 171 (FIG. 1) with node 104 (FIG. 1), e.g., as described above.

Figure 7:
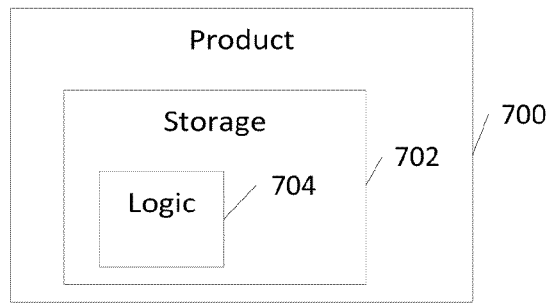
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of wireless communication nodes 102, 104, 106, 108, 110 and/or 112 (FIG. 1), wireless communication nodes 210 (FIG. 2), wireless communication nodes 310 (FIG. 3), control station 120 (FIG. 1), control station 220 (FIG. 2), control station 320 (FIG. 3), and/or wireless communication device 400 (FIG. 4), and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication controller to control a wireless communication node to communicate with one or more other wireless communication nodes via one or more backhaul links of a backhaul network over a first frequency band, and to communicate with a control station via a control link over a second frequency band, the first frequency band is higher than the second frequency band.

Example 2 includes the subject matter of Example 1 and optionally, wherein the wireless communication controller is to control the wireless communication node to receive via the control link control information from the control station, the control information defining the backhaul links and a routing map via the backhaul links, wherein the wireless communication controller is to control the wireless communication node to establish the backhaul links according to the control information.

Example 3 includes the subject matter of Example 2 and optionally, wherein the wireless communication controller is to control the wireless communication node to receive via the control link a request for connectivity information from the control station, the connectivity information relating to an ability of the wireless communication node to connect to the one or more other wireless communication nodes, wherein the wireless communication controller is to control the wireless communication node to transmit the connectivity information to the control station over the control link, and wherein the control information from the control station is based on the connectivity information.

Example 4 includes the subject matter of Example 2 or 3 and optionally, wherein the connectivity information relates to an ability of the wireless communication node to connect to a core network.

Example 5 includes the subject matter of any one of Examples 1-4 and optionally, wherein the backhaul links comprise links for communicating backhaul traffic between the one or more other wireless communication nodes and a core network.

Example 6 includes the subject matter of Example 5 and optionally, wherein the wireless communication node comprises a backhaul endpoint node to communicate over the core network.

Example 7 includes the subject matter of Example 5 or 6 and optionally, wherein the wireless communication controller is to control the wireless communication node to communicate traffic between the core network and one or more mobile devices of a wireless communication cell.

Example 8 includes the subject matter of any one of Examples 5-7 and optionally, wherein the wireless communication controller is to control the wireless communication node to communicate the backhaul traffic over a backhaul link between the wireless communication node and the control station.

Example 9 includes the subject matter of any one of Examples 1-8 and optionally, wherein the control station comprises a node of the one or more other wireless communication nodes.

Example 10 includes the subject matter of any one of Examples 1-9 and optionally, wherein the backhaul links include at least one half-duplex link.

Example 11 includes the subject matter of any one of Examples 1-10 and optionally, wherein the backhaul links include at least one full-duplex link.

Example 12 includes the subject matter of any one of Examples 1-11 and optionally, wherein the wireless communication node is to communicate with one or more mobile devices of a wireless communication cell via one or more access links.

Example 13 includes the subject matter of Example 12 and optionally, wherein the access links comprise links over a frequency band selected from the group consisting of the first and second frequency bands.

Example 14 includes the subject matter of any one of Examples 1-13 and optionally, wherein the wireless communication controller is to control the wireless communication node to simultaneously communicate over the first and second frequency bands.

Example 15 includes the subject matter of any one of Examples 1-14 and optionally, wherein the first frequency band comprises a millimeter-wave (mmWave) frequency band, and wherein the second frequency band comprises a non-mmWave frequency band.

Example 16 includes the subject matter of Example 15 and optionally, wherein the second frequency band comprises a cellular frequency band.

Example 17 includes the subject matter of Example 16 and optionally, wherein the second frequency band comprises a Long-Term-Evolution (LTE) frequency band.

Example 18 includes the subject matter of any one of Examples 1-17 and optionally, wherein the wireless communication node comprises an access point or a base station.

Example 19 includes the subject matter of any one of Examples 1-18 and optionally, wherein the control station comprises an Evolved Node B (eNB).

Example 20 includes an apparatus of wireless communication, the apparatus comprising a wireless communication controller to communicate control information between a wireless communication node of a plurality of wireless communication nodes and a control station via a control link, the control information defining one or more backhaul links between the wireless communication node and one or more other wireless communication nodes of the plurality of wireless communication nodes, the backhaul links comprising links over a first frequency band for communicating traffic between the wireless communication nodes and a core network, the control information defining a routing map for routing the traffic via the backhaul links, the control link comprises a link over a second frequency band, wherein the first frequency band is higher than the second frequency band.

Example 21 includes the subject matter of Example 20 and optionally, wherein the wireless communication controller is to control the control station to transmit the control information from the control station to the wireless communication node.

Example 22 includes the subject matter of Example 21 and optionally, wherein the wireless communication controller to is to control the control station to communicate with the one or more other wireless communication nodes via one or more other control links to define a backhaul network including a plurality of backhaul links between the plurality of wireless communication nodes.

Example 23 includes the subject matter of Example 20 and optionally, wherein the wireless communication controller to is to control the wireless communication node to receive the control information from the control station, and to establish the backhaul links based on the control information.

Example 24 includes the subject matter of Example 20 and optionally, wherein the wireless communication controller to is to communicate via the control link a request from the control station for connectivity information, the connectivity information relating to an ability of the wireless communication node to connect to the one or more other wireless communication nodes, wherein the wireless communication controller to is to communicate the connectivity information to the control station over the control link, and wherein the control information from the control station is based on the connectivity information.

Example 25 includes the subject matter of Example 24 and optionally, wherein the connectivity information relates to an ability of the wireless communication node to connect to a core network.

Example 26 includes the subject matter of any one of Examples 20-25 and optionally, wherein the wireless communication node comprises a backhaul endpoint node to communicate over the core network and to communicate the traffic between the core network and the one or more other wireless communication nodes.

Example 27 includes the subject matter of any one of Examples 20-26 and optionally, wherein the wireless communication controller to is to control the wireless communication node to communicate the traffic over a backhaul link between the wireless communication node and the control station.

Example 28 includes the subject matter of any one of Examples 20-27 and optionally, wherein the backhaul links include at least one half-duplex link.

Example 29 includes the subject matter of any one of Examples 20-28 and optionally, wherein the backhaul links include at least one full-duplex link.

Example 30 includes the subject matter of any one of Examples 20-29 and optionally, wherein the wireless communication controller to is to control the wireless communication node to simultaneously communicate over the first and second frequency bands.

Example 31 includes the subject matter of any one of Examples 20-30 and optionally, wherein the first frequency band comprises a millimeter-wave (mmWave) frequency band, and wherein the second frequency band comprises a non-mmWave frequency band.

Example 32 includes the subject matter of Example 31 and optionally, wherein the second frequency band comprises a cellular frequency band.

Example 33 includes the subject matter of Example 32 and optionally, wherein the second frequency band comprises a Long-Term-Evolution (LTE) frequency band.

Example 34 includes the subject matter of any one of Examples 20-33 and optionally, wherein the wireless communication node comprises an access point or a base station.

Example 35 includes the subject matter of any one of Examples 20-34 and optionally, wherein the control station comprises an Evolved Node B (eNB).

Example 36 includes a system of wireless communication, the system comprising a wireless communication node including one or more antennas; at least one transceiver to communicate over a first frequency band and a second frequency band, the first frequency band is higher than the second frequency band; and a wireless communication controller to control the wireless communication node to communicate with one or more other wireless communication nodes via one or more backhaul links of a backhaul network over the first frequency band, and to communicate with a control station via a control link over the second frequency band.

Example 37 includes the subject matter of Example 36 and optionally, wherein the wireless communication controller is to control the wireless communication node to receive via the control link control information from the control station, the control information defining the backhaul links and a routing map via the backhaul links, wherein the wireless communication controller is to control the wireless communication node to establish the backhaul links according to the control information.

Example 38 includes the subject matter of Example 37 and optionally, wherein the wireless communication controller is to control the wireless communication node to receive via the control link a request for connectivity information from the control station, the connectivity information relating to an ability of the wireless communication node to connect to the one or more other wireless communication nodes, wherein the wireless communication controller is to control the wireless communication node to transmit the connectivity information to the control station over the control link, and wherein the control information from the control station is based on the connectivity information.

Example 39 includes the subject matter of Example 37 or 38 and optionally, wherein the connectivity information relates to an ability of the wireless communication node to connect to a core network.

Example 40 includes the subject matter of any one of Examples 36-39 and optionally, wherein the backhaul links comprise links for communicating backhaul traffic between the one or more other wireless communication nodes and a core network.

Example 41 includes the subject matter of Example 40 and optionally, wherein the wireless communication node comprises a backhaul endpoint node to communicate over the core network.

Example 42 includes the subject matter of Example 40 or 41 and optionally, wherein the wireless communication controller is to control the wireless communication node to communicate traffic between the core network and one or more mobile devices of a wireless communication cell.

Example 43 includes the subject matter of any one of Examples 40-42 and optionally, wherein the wireless communication controller is to control the wireless communication node to communicate the backhaul traffic over a backhaul link between the wireless communication node and the control station.

Example 44 includes the subject matter of any one of Examples 36-43 and optionally, wherein the control station comprises a node of the one or more other wireless communication nodes.

Example 45 includes the subject matter of any one of Examples 36-44 and optionally, wherein the backhaul links include at least one half-duplex link.

Example 46 includes the subject matter of any one of Examples 36-45 and optionally, wherein the backhaul links include at least one full-duplex link.

Example 47 includes the subject matter of any one of Examples 36-46 and optionally, wherein the wireless communication node is to communicate with one or more mobile devices of a wireless communication cell via one or more access links.

Example 48 includes the subject matter of Example 47 and optionally, wherein the access links comprise links over a frequency band selected from the group consisting of the first and second frequency bands.

Example 49 includes the subject matter of any one of Examples 36-48 and optionally, wherein the wireless communication controller is to control the wireless communication node to simultaneously communicate over the first and second frequency bands.

Example 50 includes the subject matter of any one of Examples 36-49 and optionally, wherein the one or more antennas comprise an antenna array, and wherein the wireless communication controller is to control the antenna array to communicate the backhaul links over a plurality of directional beams.

Example 51 includes the subject matter of any one of Examples 36-50 and optionally, wherein the first frequency band comprises a millimeter-wave (mmWave) frequency band, and wherein the second frequency band comprises a non-mmWave frequency band.

Example 52 includes the subject matter of Example 51 and optionally, wherein the second frequency band comprises a cellular frequency band.

Example 53 includes the subject matter of Example 52 and optionally, wherein the second frequency band comprises a Long-Term-Evolution (LTE) frequency band.

Example 54 includes the subject matter of any one of Examples 36-53 and optionally, wherein the wireless communication node comprises an access point or a base station.

Example 55 includes the subject matter of any one of Examples 36-54 and optionally, wherein the control station comprises an Evolved Node B (eNB).

Example 56 includes a system of wireless communication, the system comprising a wireless communication device including one or more antennas; at least one transceiver to communicate over a first frequency band and a second frequency band, the first frequency band is higher than the second frequency band; and a wireless communication controller to control the wireless communication device to communicate control information between a wireless communication node of a plurality of wireless communication nodes and a control station via a control link, the control information defining one or more backhaul links between the wireless communication node and one or more other wireless communication nodes of the plurality of wireless communication nodes, the backhaul links comprising links over the first frequency band for communicating traffic between the wireless communication nodes and a core network, the control information defining a routing map for routing the traffic via the backhaul links, the control link comprises a link over the second frequency band.

Example 57 includes the subject matter of Example 56 and optionally, wherein the wireless communication controller is to control the control station to transmit the control information from the control station to the wireless communication node.

Example 58 includes the subject matter of Example 57 and optionally, wherein the wireless communication controller to is to control the control station to communicate with the one or more other wireless communication nodes via one or more other control links to define a backhaul network including a plurality of backhaul links between the plurality of wireless communication nodes.

Example 59 includes the subject matter of Example 56 and optionally, wherein the wireless communication controller to is to control the wireless communication node to receive the control information from the control station, and to establish the backhaul links based on the control information.

Example 60 includes the subject matter of Example 56 and optionally, wherein the wireless communication controller to is to communicate via the control link a request from the control station for connectivity information, the connectivity information relating to an ability of the wireless communication node to connect to the one or more other wireless communication nodes, wherein the wireless communication controller to is to communicate the connectivity information to the control station over the control link, and wherein the control information from the control station is based on the connectivity information.

Example 61 includes the subject matter of Example 60 and optionally, wherein the connectivity information relates to an ability of the wireless communication node to connect to a core network.

Example 62 includes the subject matter of any one of Examples 56-61 and optionally, wherein the wireless communication node comprises a backhaul endpoint node to communicate over the core network and to communicate the traffic between the core network and the one or more other wireless communication nodes.

Example 63 includes the subject matter of any one of Examples 56-62 and optionally, wherein the wireless communication controller to is to control the wireless communication node to communicate the traffic over a backhaul link between the wireless communication node and the control station.

Example 64 includes the subject matter of any one of Examples 56-63 and optionally, wherein the backhaul links include at least one half-duplex link.

Example 65 includes the subject matter of any one of Examples 56-64 and optionally, wherein the backhaul links include at least one full-duplex link.

Example 66 includes the subject matter of any one of Examples 56-65 and optionally, wherein the wireless communication controller to is to control the wireless communication node to simultaneously communicate over the first and second frequency bands.

Example 67 includes the subject matter of any one of Examples 56-66 and optionally, wherein the first frequency band comprises a millimeter-wave (mmWave) frequency band, and wherein the second frequency band comprises a non-mmWave frequency band.

Example 68 includes the subject matter of Example 67 and optionally, wherein the second frequency band comprises a cellular frequency band.

Example 69 includes the subject matter of Example 68 and optionally, wherein the second frequency band comprises a Long-Term-Evolution (LTE) frequency band.

Example 70 includes the subject matter of any one of Examples 56-69 and optionally, wherein the wireless communication node comprises an access point or a base station.

Example 71 includes the subject matter of any one of Examples 56-70 and optionally, wherein the control station comprises an Evolved Node B (eNB).

Example 72 includes a method of wireless communication, the method comprising communicating between a wireless communication node and one or more other wireless communication nodes via one or more backhaul links of a backhaul network over a first frequency band; and communicating between the wireless communication node and a control station via a control link over a second frequency band, the first frequency band is higher than the second frequency band.

Example 73 includes the subject matter of Example 72 and optionally comprising receiving via the control link control information from the control station, the control information defining the backhaul links and a routing map via the backhaul links; and establishing the backhaul links according to the control information.

Example 74 includes the subject matter of Example 73 and optionally comprising receiving via the control link a request for connectivity information from the control station, the connectivity information relating to an ability of the wireless communication node to connect to the one or more other wireless communication nodes; and transmitting the connectivity information to the control station over the control link, wherein the control information from the control station is based on the connectivity information.

Example 75 includes the subject matter of Example 73 or 74 and optionally, wherein the connectivity information relates to an ability of the wireless communication node to connect to a core network.

Example 76 includes the subject matter of any one of Examples 72-75 and optionally, wherein the backhaul links comprise links for communicating backhaul traffic between the one or more other wireless communication nodes and a core network.

Example 77 includes the subject matter of Example 76 and optionally, wherein the wireless communication node comprises a backhaul endpoint node to communicate over the core network.

Example 78 includes the subject matter of Example 76 or 77 and optionally comprising communicating traffic between the core network and one or more mobile devices of a wireless communication cell.

Example 79 includes the subject matter of any one of Examples 76-78 and optionally comprising communicating the backhaul traffic over a backhaul link between the wireless communication node and the control station.

Example 80 includes the subject matter of any one of Examples 72-79 and optionally, wherein the control station comprises a node of the one or more other wireless communication nodes.

Example 81 includes the subject matter of any one of Examples 72-80 and optionally, wherein the backhaul links include at least one half-duplex link.

Example 82 includes the subject matter of any one of Examples 72-81 and optionally, wherein the backhaul links include at least one full-duplex link.

Example 83 includes the subject matter of any one of Examples 72-82 and optionally comprising communicating with one or more mobile devices of a wireless communication cell via one or more access links.

Example 84 includes the subject matter of Example 83 and optionally, wherein the access links comprise links over a frequency band selected from the group consisting of the first and second frequency bands.

Example 85 includes the subject matter of any one of Examples 72-84 and optionally comprising simultaneously communicating over the first and second frequency bands.

Example 86 includes the subject matter of any one of Examples 72-85 and optionally, wherein the first frequency band comprises a millimeter-wave (mmWave) frequency band, and wherein the second frequency band comprises a non-mmWave frequency band.

Example 87 includes the subject matter of Example 86 and optionally, wherein the second frequency band comprises a cellular frequency band.

Example 88 includes the subject matter of Example 87 and optionally, wherein the second frequency band comprises a Long-Term-Evolution (LTE) frequency band.

Example 89 includes the subject matter of any one of Examples 72-88 and optionally, wherein the wireless communication node comprises an access point or a base station.

Example 90 includes the subject matter of any one of Examples 72-89 and optionally, wherein the control station comprises an Evolved Node B (eNB).

Example 91 includes a method of wireless communication, the method comprising communicating control information between a wireless communication node of a plurality of wireless communication nodes and a control station via a control link, the control information defining one or more backhaul links between the wireless communication node and one or more other wireless communication nodes of the plurality of wireless communication nodes, the backhaul links comprising links over a first frequency band for communicating traffic between the wireless communication nodes and a core network, the control information defining a routing map for routing the traffic via the backhaul links, the control link comprises a link over a second frequency band, wherein the first frequency band is higher than the second frequency band.

Example 92 includes the subject matter of Example 91 and optionally comprising transmitting the control information from the control station to the wireless communication node.

Example 93 includes the subject matter of Example 92 and optionally comprising communicating with the one or more other wireless communication nodes via one or more other control links to define a backhaul network including a plurality of backhaul links between the plurality of wireless communication nodes.

Example 94 includes the subject matter of Example 91 and optionally comprising receiving the control information from the control station, and establishing the backhaul links based on the control information.

Example 95 includes the subject matter of Example 91 and optionally comprising communicating via the control link a request from the control station for connectivity information, the connectivity information relating to an ability of the wireless communication node to connect to the one or more other wireless communication nodes; and communicating the connectivity information to the control station over the control link, wherein the control information from the control station is based on the connectivity information.

Example 96 includes the subject matter of Example 95 and optionally, wherein the connectivity information relates to an ability of the wireless communication node to connect to a core network.

Example 97 includes the subject matter of any one of Examples 91-96 and optionally, wherein the wireless communication node comprises a backhaul endpoint node to communicate over the core network and to communicate the traffic between the core network and the one or more other wireless communication nodes.

Example 98 includes the subject matter of any one of Examples 91-97 and optionally comprising communicating the traffic over a backhaul link between the wireless communication node and the control station.

Example 99 includes the subject matter of any one of Examples 91-98 and optionally, wherein the backhaul links include at least one half-duplex link.

Example 100 includes the subject matter of any one of Examples 91-99 and optionally, wherein the backhaul links include at least one full-duplex link.

Example 101 includes the subject matter of any one of Examples 91-100 and optionally comprising simultaneously communicating over the first and second frequency bands.

Example 102 includes the subject matter of any one of Examples 91-101 and optionally, wherein the first frequency band comprises a millimeter-wave (mmWave) frequency band, and wherein the second frequency band comprises a non-mmWave frequency band.

Example 103 includes the subject matter of Example 102 and optionally, wherein the second frequency band comprises a cellular frequency band.

Example 104 includes the subject matter of Example 103 and optionally, wherein the second frequency band comprises a Long-Term-Evolution (LTE) frequency band.

Example 105 includes the subject matter of any one of Examples 91-104 and optionally, wherein the wireless communication node comprises an access point or a base station.

Example 106 includes the subject matter of any one of Examples 91-105 and optionally, wherein the control station comprises an Evolved Node B (eNB).

Example 107 includes a product including a non-transitory storage medium having stored thereon instructions that, when executed by a machine, result in communicating between a wireless communication node and one or more other wireless communication nodes via one or more backhaul links of a backhaul network over a first frequency band; and communicating between the wireless communication node and a control station via a control link over a second frequency band, the first frequency band is higher than the second frequency band.

Example 108 includes the subject matter of Example 107 and optionally, wherein the instructions result in receiving via the control link control information from the control station, the control information defining the backhaul links and a routing map via the backhaul links; and establishing the backhaul links according to the control information.

Example 109 includes the subject matter of Example 108 and optionally, wherein the instructions result in receiving via the control link a request for connectivity information from the control station, the connectivity information relating to an ability of the wireless communication node to connect to the one or more other wireless communication nodes; and transmitting the connectivity information to the control station over the control link, wherein the control information from the control station is based on the connectivity information.

Example 110 includes the subject matter of Example 108 or 109 and optionally, wherein the connectivity information relates to an ability of the wireless communication node to connect to a core network.

Example 111 includes the subject matter of any one of Examples 107-110 and optionally, wherein the backhaul links comprise links for communicating backhaul traffic between the one or more other wireless communication nodes and a core network.

Example 112 includes the subject matter of Example 111 and optionally, wherein the wireless communication node comprises a backhaul endpoint node to communicate over the core network.

Example 113 includes the subject matter of Example 111 or 112 and optionally, wherein the instructions result in communicating traffic between the core network and one or more mobile devices of a wireless communication cell.

Example 114 includes the subject matter of any one of Examples 111-113 and optionally, wherein the instructions result in communicating the backhaul traffic over a backhaul link between the wireless communication node and the control station.

Example 115 includes the subject matter of any one of Examples 107-114 and optionally, wherein the control station comprises a node of the one or more other wireless communication nodes.

Example 116 includes the subject matter of any one of Examples 107-115 and optionally, wherein the backhaul links include at least one half-duplex link.

Example 117 includes the subject matter of any one of Examples 107-116 and optionally, wherein the backhaul links include at least one full-duplex link.

Example 118 includes the subject matter of any one of Examples 107-117 and optionally, wherein the instructions result in communicating with one or more mobile devices of a wireless communication cell via one or more access links.

Example 119 includes the subject matter of Example 118 and optionally, wherein the access links comprise links over a frequency band selected from the group consisting of the first and second frequency bands.

Example 120 includes the subject matter of any one of Examples 107-119 and optionally, wherein the instructions result in simultaneously communicating over the first and second frequency bands.

Example 121 includes the subject matter of any one of Examples 107-120 and optionally, wherein the first frequency band comprises a millimeter-wave (mmWave) frequency band, and wherein the second frequency band comprises a non-mmWave frequency band.

Example 122 includes the subject matter of Example 121 and optionally, wherein the second frequency band comprises a cellular frequency band.

Example 123 includes the subject matter of Example 122 and optionally, wherein the second frequency band comprises a Long-Term-Evolution (LTE) frequency band.

Example 124 includes the subject matter of any one of Examples 107-123 and optionally, wherein the wireless communication node comprises an access point or a base station.

Example 125 includes the subject matter of any one of Examples 107-124 and optionally, wherein the control station comprises an Evolved Node B (eNB).

Example 126 includes q product including a non-transitory storage medium having stored thereon instructions that, when executed by a machine, result in communicating control information between a wireless communication node of a plurality of wireless communication nodes and a control station via a control link, the control information defining one or more backhaul links between the wireless communication node and one or more other wireless communication nodes of the plurality of wireless communication nodes, the backhaul links comprising links over a first frequency band for communicating traffic between the wireless communication nodes and a core network, the control information defining a routing map for routing the traffic via the backhaul links, the control link comprises a link over a second frequency band, wherein the first frequency band is higher than the second frequency band.

Example 127 includes the subject matter of Example 126 and optionally, wherein the instructions result in transmitting the control information from the control station to the wireless communication node.

Example 128 includes the subject matter of Example 127 and optionally, wherein the instructions result in communicating with the one or more other wireless communication nodes via one or more other control links to define a backhaul network including a plurality of backhaul links between the plurality of wireless communication nodes.

Example 129 includes the subject matter of Example 126 and optionally, wherein the instructions result in receiving the control information from the control station, and establishing the backhaul links based on the control information.

Example 130 includes the subject matter of Example 126 and optionally, wherein the instructions result in communicating via the control link a request from the control station for connectivity information, the connectivity information relating to an ability of the wireless communication node to connect to the one or more other wireless communication nodes; and communicating the connectivity information to the control station over the control link, wherein the control information from the control station is based on the connectivity information.

Example 131 includes the subject matter of Example 130 and optionally, wherein the connectivity information relates to an ability of the wireless communication node to connect to a core network.

Example 132 includes the subject matter of any one of Examples 126-131 and optionally, wherein the wireless communication node comprises a backhaul endpoint node to communicate over the core network and to communicate the traffic between the core network and the one or more other wireless communication nodes.

Example 133 includes the subject matter of any one of Examples 126-132 and optionally, wherein the instructions result in communicating the traffic over a backhaul link between the wireless communication node and the control station.

Example 134 includes the subject matter of any one of Examples 126-133 and optionally, wherein the backhaul links include at least one half-duplex link.

Example 135 includes the subject matter of any one of Examples 126-134 and optionally, wherein the backhaul links include at least one full-duplex link.

Example 136 includes the subject matter of any one of Examples 126-135 and optionally, wherein the instructions result in simultaneously communicating over the first and second frequency bands.

Example 137 includes the subject matter of any one of Examples 126-136 and optionally, wherein the first frequency band comprises a millimeter-wave (mmWave) frequency band, and wherein the second frequency band comprises a non-mmWave frequency band.

Example 138 includes the subject matter of Example 137 and optionally, wherein the second frequency band comprises a cellular frequency band.

Example 139 includes the subject matter of Example 138 and optionally, wherein the second frequency band comprises a Long-Term-Evolution (LTE) frequency band.

Example 140 includes the subject matter of any one of Examples 126-139 and optionally, wherein the wireless communication node comprises an access point or a base station.

Example 141 includes the subject matter of any one of Examples 126-140 and optionally, wherein the control station comprises an Evolved Node B (eNB).

Example 142 includes an apparatus of wireless communication, the apparatus comprising means for communicating between a wireless communication node and one or more other wireless communication nodes via one or more backhaul links of a backhaul network over a first frequency band; and means for communicating between the wireless communication node and a control station via a control link over a second frequency band, the first frequency band is higher than the second frequency band.

Example 143 includes the subject matter of Example 142 and optionally comprising means for receiving via the control link control information from the control station, the control information defining the backhaul links and a routing map via the backhaul links; and establishing the backhaul links according to the control information.

Example 144 includes the subject matter of Example 143 and optionally comprising means for receiving via the control link a request for connectivity information from the control station, the connectivity information relating to an ability of the wireless communication node to connect to the one or more other wireless communication nodes; and means for transmitting the connectivity information to the control station over the control link, wherein the control information from the control station is based on the connectivity information.

Example 145 includes the subject matter of Example 143 or 144 and optionally, wherein the connectivity information relates to an ability of the wireless communication node to connect to a core network.

Example 146 includes the subject matter of any one of Examples 142-145 and optionally, wherein the backhaul links comprise links for communicating backhaul traffic between the one or more other wireless communication nodes and a core network.

Example 147 includes the subject matter of Example 146 and optionally, wherein the wireless communication node comprises a backhaul endpoint node to communicate over the core network.

Example 148 includes the subject matter of Example 146 or 147 and optionally comprising means for communicating traffic between the core network and one or more mobile devices of a wireless communication cell.

Example 149 includes the subject matter of any one of Examples 146-148 and optionally comprising means for communicating the backhaul traffic over a backhaul link between the wireless communication node and the control station.

Example 150 includes the subject matter of any one of Examples 142-149 and optionally, wherein the control station comprises a node of the one or more other wireless communication nodes.

Example 151 includes the subject matter of any one of Examples 142-150 and optionally, wherein the backhaul links include at least one half-duplex link.

Example 152 includes the subject matter of any one of Examples 142-151 and optionally, wherein the backhaul links include at least one full-duplex link.

Example 153 includes the subject matter of any one of Examples 142-152 and optionally comprising means for communicating with one or more mobile devices of a wireless communication cell via one or more access links.

Example 154 includes the subject matter of Example 153 and optionally, wherein the access links comprise links over a frequency band selected from the group consisting of the first and second frequency bands.

Example 155 includes the subject matter of any one of Examples 142-154 and optionally comprising means for simultaneously communicating over the first and second frequency bands.

Example 156 includes the subject matter of any one of Examples 142-155 and optionally, wherein the first frequency band comprises a millimeter-wave (mmWave) frequency band, and wherein the second frequency band comprises a non-mmWave frequency band.

Example 157 includes the subject matter of Example 156 and optionally, wherein the second frequency band comprises a cellular frequency band.

Example 158 includes the subject matter of Example 157 and optionally, wherein the second frequency band comprises a Long-Term-Evolution (LTE) frequency band.

Example 159 includes the subject matter of any one of Examples 142-158 and optionally, wherein the wireless communication node comprises an access point or a base station.

Example 160 includes the subject matter of any one of Examples 142-159 and optionally, wherein the control station comprises an Evolved Node B (eNB).

Example 161 includes an apparatus of wireless communication, the apparatus comprising means for communicating control information between a wireless communication node of a plurality of wireless communication nodes and a control station via a control link, the control information defining one or more backhaul links between the wireless communication node and one or more other wireless communication nodes of the plurality of wireless communication nodes, the backhaul links comprising links over a first frequency band for communicating traffic between the wireless communication nodes and a core network, the control information defining a routing map for routing the traffic via the backhaul links, the control link comprises a link over a second frequency band, wherein the first frequency band is higher than the second frequency band.

Example 162 includes the subject matter of Example 161 and optionally comprising means for transmitting the control information from the control station to the wireless communication node.

Example 163 includes the subject matter of Example 162 and optionally comprising means for communicating with the one or more other wireless communication nodes via one or more other control links to define a backhaul network including a plurality of backhaul links between the plurality of wireless communication nodes.

Example 164 includes the subject matter of Example 161 and optionally comprising means for receiving the control information from the control station, and establishing the backhaul links based on the control information.

Example 165 includes the subject matter of Example 161 and optionally comprising means for communicating via the control link a request from the control station for connectivity information, the connectivity information relating to an ability of the wireless communication node to connect to the one or more other wireless communication nodes; and means for communicating the connectivity information to the control station over the control link, wherein the control information from the control station is based on the connectivity information.

Example 166 includes the subject matter of Example 165 and optionally, wherein the connectivity information relates to an ability of the wireless communication node to connect to a core network.

Example 167 includes the subject matter of any one of Examples 161-166 and optionally, wherein the wireless communication node comprises a backhaul endpoint node to communicate over the core network and to communicate the traffic between the core network and the one or more other wireless communication nodes.

Example 168 includes the subject matter of any one of Examples 161-167 and optionally comprising means for communicating the traffic over a backhaul link between the wireless communication node and the control station.

Example 169 includes the subject matter of any one of Examples 161-168 and optionally, wherein the backhaul links include at least one half-duplex link.

Example 170 includes the subject matter of any one of Examples 161-169 and optionally, wherein the backhaul links include at least one full-duplex link.

Example 171 includes the subject matter of any one of Examples 161-170 and optionally comprising means for simultaneously communicating over the first and second frequency bands.

Example 172 includes the subject matter of any one of Examples 161-171 and optionally, wherein the first frequency band comprises a millimeter-wave (mmWave) frequency band, and wherein the second frequency band comprises a non-mmWave frequency band.

Example 173 includes the subject matter of Example 172 and optionally, wherein the second frequency band comprises a cellular frequency band.

Example 174 includes the subject matter of Example 173 and optionally, wherein the second frequency band comprises a Long-Term-Evolution (LTE) frequency band.

Example 175 includes the subject matter of any one of Examples 161-174 and optionally, wherein the wireless communication node comprises an access point or a base station.

Example 176 includes the subject matter of any one of Examples 161-175 and optionally, wherein the control station comprises an Evolved Node B (eNB).

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a wireless communication controller to control a wireless communication node to communicate with one or more other wireless communication nodes via one or more backhaul links of a backhaul network over a first frequency band, and to communicate with a control station via a control link over a second frequency band, said first frequency band is higher than said second frequency band, said wireless communication controller is configured to control said wireless communication node to receive via said control link control information from said control station, the control information defining said backhaul links and a routing map via said backhaul links, said wireless communication controller is configured to control said wireless communication node to establish said backhaul links according to said control information.

2. The apparatus of claim 1, wherein said wireless communication controller is to control said wireless communication node to receive via said control link a request for connectivity information from said control station, said connectivity information relating to an ability of said wireless communication node to connect to said one or more other wireless communication nodes, wherein said wireless communication controller is to control said wireless communication node to transmit said connectivity information to said control station over said control link, and wherein the control information from said control station is based on said connectivity information.

3. The apparatus of claim 2, wherein said connectivity information relates to an ability of said wireless communication node to connect to a core network.

4. The apparatus of claim 1, wherein said backhaul links comprise links for communicating backhaul traffic between said one or more other wireless communication nodes and a core network.

5. The apparatus of claim 4, wherein said wireless communication node comprises a backhaul endpoint node to communicate over said core network.

6. The apparatus of claim 4, wherein said wireless communication controller is to control said wireless communication node to communicate traffic between said core network and one or more mobile devices of a wireless communication cell.

7. The apparatus of claim 4, wherein said wireless communication controller is to control said wireless communication node to communicate said backhaul traffic over a backhaul link between said wireless communication node and said control station.

8. The apparatus of claim 1, wherein said control station comprises a node of said one or more other wireless communication nodes.

9. The apparatus of claim 1, wherein said backhaul links include at least one half-duplex link.

10. The apparatus of claim 1, wherein said backhaul links include at least one full-duplex link.

11. The apparatus of claim 1, wherein said wireless communication node is to communicate with one or more mobile devices of a wireless communication cell via one or more access links.

12. The apparatus of claim 11, wherein said access links comprise links over a frequency band selected from the group consisting of said first and second frequency bands.

13. The apparatus of claim 1, wireless said communication controller is to control said wireless communication node to simultaneously communicate over said first and second frequency bands.

14. The apparatus of claim 1, wherein said first frequency band comprises a millimeter-wave (mmWave) frequency band, and wherein said second frequency band comprises a non-mmWave frequency band.

15. The apparatus of claim 14, wherein said second frequency band comprises a cellular frequency band.

16. The apparatus of claim 15, wherein said second frequency band comprises a Long-Term-Evolution (LTE) frequency band.

17. The apparatus of claim 1, wherein said wireless communication node comprises an access point or a base station.

18. The apparatus of claim 1, wherein said control station comprises an Evolved Node B (eNB).

19. A system comprising:
a wireless communication device including:
one or more antennas;
at least one transceiver to communicate over a first frequency band and a second frequency band, said first frequency band is higher than said second frequency band; and
a wireless communication controller to control said wireless communication device to communicate control information between a wireless communication node of a plurality of wireless communication nodes and a control station via a control link, said control information defining one or more backhaul links between said wireless communication node and one or more other wireless communication nodes of said plurality of wireless communication nodes, said backhaul links comprising links over said first frequency band for communicating traffic between said wireless communication nodes and a core network, said control information defining a routing map for routing said traffic via said backhaul links, said control link comprises a link over said second frequency band.

20. The system of claim 19, wherein said wireless communication controller is to control said control station to transmit said control information from said control station to said wireless communication node.

21. The system of claim 19, wherein said wireless communication controller is to control said wireless communication node to receive said control information from said control station, and to establish said backhaul links based on said control information.

22. The system of claim 19, wherein said wireless communication controller is to communicate via said control link a request from said control station for connectivity information, said connectivity information relating to an ability of said wireless communication node to connect to said one or more other wireless communication nodes, wherein said wireless communication controller is to communicate said connectivity information to said control station over said control link, and wherein the control information from said control station is based on said connectivity information.

23. The system of claim 19, wherein said wireless communication controller is to control said wireless communication node to communicate said traffic over a backhaul link between said wireless communication node and said control station.

24. A method of wireless communication, the method comprising:
communicating control information between a wireless communication node of a plurality of wireless communication nodes and a control station via a control link, said control information defining one or more backhaul links between said wireless communication node and one or more other wireless communication nodes of said plurality of wireless communication nodes, said backhaul links comprising links over a first frequency band for communicating traffic between said wireless communication nodes and a core network, said control information defining a routing map for routing said traffic via said backhaul links, said control link comprises a link over a second frequency band, wherein said first frequency band is higher than said second frequency band.

25. The method of claim 24 comprising transmitting said control information from said control station to said wireless communication node.

26. The method of claim 24 comprising receiving said control information from said control station, and establishing said backhaul links based on said control information.

27. A product including a non-transitory storage medium having stored thereon instructions that, when executed by a machine, result in performing one or more operations at a wireless communication node, the operations comprising:
communicating between the wireless communication node and one or more other wireless communication nodes via one or more backhaul links of a backhaul network over a first frequency band; and
communicating between said wireless communication node and a control station via a control link over a second frequency band, said first frequency band is higher than said second frequency band,
wherein the operations comprise receiving via said control link control information from said control station, the control information defining said backhaul links and a routing map via said backhaul links, and establishing said backhaul links according to said control information.

28. The product of claim 27, wherein said backhaul links comprise one or more links configured to communicate backhaul traffic between said one or more other wireless communication nodes and a core network.

29. The product of claim 27, wherein said instructions result in receiving via said control link a request for connectivity information from said control station, said connectivity information relating to an ability of said wireless communication node to connect to said one or more other wireless communication nodes; and transmitting said connectivity information to said control station over said control link, wherein the control information from said control station is based on said connectivity information.

* * * * *